(12) United States Patent
Ni et al.

(10) Patent No.: US 12,664,723 B2
(45) Date of Patent: Jun. 23, 2026

(54) VR INTERACTION METHOD AND APPARATUS

(71) Applicant: Huawei Technologies Co., Ltd., Shenzhen (CN)

(72) Inventors: Yintang Ni, Shenzhen (CN); Bingjie Huang, Shanghai (CN); Baotai Shao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 495 days.

(21) Appl. No.: 18/255,003

(22) PCT Filed: Nov. 26, 2021

(86) PCT No.: PCT/CN2021/133661

§ 371 (c)(1),
(2) Date: May 30, 2023

(87) PCT Pub. No.: WO2022/111648

PCT Pub. Date: Jun. 2, 2022

(65) Prior Publication Data

US 2024/0020917 A1    Jan. 18, 2024

(30) Foreign Application Priority Data

Nov. 30, 2020    (CN) .......................... 202011385259.4

(51) Int. Cl.
*G06F 1/16* (2006.01)
*G04G 9/00* (2006.01)
(Continued)

(52) U.S. Cl.
CPC ............. *G06T 17/00* (2013.01); *G04G 9/007* (2013.01); *G06F 1/163* (2013.01); *G06F 3/011* (2013.01);
(Continued)

(58) Field of Classification Search
None
See application file for complete search history.

(56) References Cited

U.S. PATENT DOCUMENTS

2017/0060518 A1*  3/2017  Hong .................... G06F 3/0482
2017/0364242 A1* 12/2017  Bhageria ........... H04M 1/72445
(Continued)

FOREIGN PATENT DOCUMENTS

CN        107249071 A      10/2017
CN        111936959 A      11/2020

*Primary Examiner* — Christopher J Fibbi
(74) *Attorney, Agent, or Firm* — Conley Rose, P.C.

(57) ABSTRACT

A method, implemented by a terminal, includes sending, to a wearable device, a virtual reality (VR) start instruction when the terminal starts running a first VR application, wherein the VR start instruction instructs the wearable device to switch from a normal running mode to a VR mode, receiving, from the wearable device and in response to a first operation by a user on a VR basic operation interface, a first instruction, starting running, based on the first instruction, a first VR sub-application of VR sub-applications comprised in the first VR application, selecting, from preset VR operation interfaces, a first VR operation interface that matches configuration information of the first VR sub-application, configuring the first VR operation interface for the wearable device for display, receiving, from the wearable device, a second instruction; and controlling, based on the second instruction, the first VR sub-application to execute a first control function.

20 Claims, 22 Drawing Sheets

Game 1

(51) Int. Cl.
  *G06F 3/01*          (2006.01)
  *G06F 3/04815*       (2022.01)
  *G06F 3/04886*       (2022.01)
  *G06T 17/00*         (2006.01)

(52) U.S. Cl.
  CPC ...... *G06F 3/04815* (2013.01); *G06F 3/04886*
                                    (2013.01)

(56)                References Cited

U.S. PATENT DOCUMENTS

2018/0095636  A1*   4/2018  Valdivia ................... G06F 3/011
2018/0246577  A1*   8/2018  Bostick ................. G06F 3/0346
2019/0018444  A1*   1/2019  Huang ............... G06F 3/04842
2019/0146219  A1*   5/2019  Rodriguez, II ....... G06F 3/0482
                                                     345/633
2019/0385372  A1*  12/2019  Cartwright ............ G06T 19/003
2022/0028168  A1*   1/2022  Kabra .................... G06V 20/64
2023/0418544  A1*  12/2023  Imai ................... G02B 27/0172

* cited by examiner

Button area 2

Button area 1

Button area 1

Button area 2

(a)

(b)

Game 1

VR INTERACTION METHOD AND APPARATUS

CROSS-REFERENCE TO RELATED APPLICATIONS

This application is a National Stage of International Patent Application No. PCT/CN2021/133661, filed on Nov. 26, 2021, which claims priority to Chinese Patent Application No. 202011385259.4 filed on Nov. 30, 2020. Both of the aforementioned applications are hereby incorporated by reference in their entireties.

TECHNICAL FIELD

Embodiments of this application relate to the field of electronic devices, and in particular, to a VR interaction method and an apparatus.

BACKGROUND

Virtual reality (virtual reality, VR) glasses, also called a VR head mounted display device or a VR head mounted display, can be used by a user to view multimedia files or experience VR applications. For example, the user may watch a movie, a music video (music video, MV), play a game, or the like via the VR glasses.

Currently, to improve an interaction capability between the VR glasses and the user, a VR peripheral, for example, a VR handle, is set with the VR glasses. The VR peripheral may be connected to the VR glasses, and the user may implement interaction with the VR glasses via the VR peripheral. However, although the VR peripheral improves the interaction capability between the VR glasses and the user, the VR glasses can be used only after being paired with the VR peripheral that is set with the VR glasses.

SUMMARY

Embodiments of this application provide a VR interaction method and an apparatus, so that a wearable device such as a watch or a band may be reused as a VR peripheral, to help a user interact with VR glasses.

According to a first aspect, an embodiment of this application provides a VR interaction method, and the method may be applied to a first terminal. The method includes: When a first terminal starts running a first VR application, the first terminal sends a VR start instruction to a wearable device, where the VR start instruction instructs the wearable device to switch from a normal running mode to a VR mode, so that the wearable device displays a VR basic operation interface. The first terminal receives a first instruction from the wearable device, and starts running a first VR sub-application based on the first instruction, where the first instruction is sent by the wearable device to the first terminal in response to a first operation by a user on the VR basic operation interface, and the first VR sub-application is one of VR sub-applications included in the first VR application. When the first terminal runs the first VR sub-application, the first terminal selects, from a plurality of preset VR operation interfaces, a first VR operation interface that matches configuration information of the first VR sub-application. The first terminal configures the first VR operation interface for the wearable device for display. The first terminal receives a second instruction from the wearable device, and controls, based on the second instruction, the first VR sub-application to execute a first control function, where the second instruction is sent by the wearable device to the first terminal in response to a second operation by the user on the first VR operation interface.

According to the method, the wearable device such as a watch or a band may be reused as a VR peripheral, to help the user interact with VR glasses. The user does not need to set a VR peripheral for the VR glasses for pairing, so as to reduce costs of the VR peripheral. In addition, the wearable device such as a watch or a band is reused as the VR peripheral, so that the user can carry the wearable device conveniently, thereby improving user experience.

Optionally, each preset VR operation interface includes at least one function control, the configuration information of the first VR sub-application includes at least one control function of the first VR sub-application, and that the first terminal selects, from a plurality of preset VR operation interfaces, a first VR operation interface that matches configuration information of the first VR sub-application includes: The first terminal selects, from the plurality of preset VR operation interfaces, the first VR operation interface that includes a function control for which a mapping relationship with a control function of the first VR sub-application can be established.

Optionally, the first terminal is further connected to VR glasses, and the method further includes: When the first terminal runs the first VR application, the first terminal performs synthesis and rendering on an interface of the first VR application and the VR basic operation interface, and sends a synthesized image of the interface of the first VR application and the VR basic operation interface to the VR glasses. When the first terminal runs the first VR sub-application, the first terminal performs synthesis and rendering on an interface of the first VR sub-application and the first VR operation interface, and sends a synthesized image of the interface of the first VR sub-application and the first VR operation interface to the VR glasses.

Optionally, the method further includes: The first terminal receives a location relationship that is of a finger of the user relative to the VR basic operation interface and that is detected and determined by the wearable device. When performing synthesis and rendering on the interface of the first VR application and the VR basic operation interface, the first terminal generates a virtual finger in the synthesized image of the interface of the first VR application and the VR basic operation interface based on the location relationship of the finger of the user relative to the VR basic operation interface.

Optionally, the method further includes: The first terminal receives a location relationship that is of the finger of the user relative to the first VR operation interface and that is detected and determined by the wearable device. When performing synthesis and rendering on the interface of the first VR sub-application and the first VR operation interface, the first terminal generates a virtual finger in the synthesized image of the interface of the first VR sub-application and the first VR operation interface based on the location relationship of the finger of the user relative to the first VR operation interface.

For example, when the user wears the VR glasses, the user may not be able to directly look at a watch face of a watch when operating the watch. However, by generating the virtual finger in the synthesized image, the user can intuitively see, from a field of view of the VR glasses, an operation performed by the user on the watch face of the watch.

Optionally, the first terminal is further connected to VR glasses, a camera is mounted on the VR glasses, and the method further includes: The first terminal receives a video image in which the user holds the wearable device in hand and that is captured by the camera of the VR glasses. When the first terminal runs the first VR application, the first terminal performs synthesis and rendering on an interface of the first VR application and the video image, and sends a synthesized image of the interface of the first VR application and the video image to the VR glasses. When the first terminal runs the first VR sub-application, the first terminal performs synthesis and rendering on an interface of the first VR sub-application and the video image, and sends a synthesized image of the interface of the first VR sub-application and the video image to the VR glasses.

Similarly, the video image in which the user holds the watch in hand and that is captured by the camera is added to the synthesized image, and the user can also intuitively see, from the field of view of the VR glasses, the operation performed by the user on the watch face of the watch.

Optionally, the method further includes: The first terminal receives a first update instruction from the wearable device, and updates, based on the update instruction, the mapping relationship between the control function of the first VR sub-application and the function control included in the first VR operation interface.

Optionally, the method further includes: The first terminal receives a second update instruction from the wearable device, and updates, based on the second update instruction, a layout of an area in which the function control on the first VR operation interface is located.

Optionally, the method further includes: When the first terminal performs synthesis and rendering on an interface of the first VR sub-application and the first VR operation interface, if the first VR operation interface is in a configurable state, the first terminal zooms in the first VR operation interface relative to the interface of the first VR sub-application.

Optionally, the method further includes: When the first terminal performs synthesis and rendering on the interface of the first VR sub-application and the first VR operation interface, if the first VR operation interface is in the configurable state, the first terminal weakens the interface of the first VR sub-application.

Optionally, the method further includes: When the first terminal runs the first VR sub-application, the first terminal displays an interface of the first VR sub-application and the first VR operation interface through screen splitting. The first terminal switches the first VR operation interface to a configurable state in response to a configuration trigger operation used for the first VR operation interface displayed by the first terminal. The first terminal updates, in response to a first update operation by the user on the first VR operation interface in the configurable state, the mapping relationship between the control function of the first VR sub-application and the function control included in the first VR operation interface.

Optionally, the method further includes: The first terminal updates, in response to a second update operation by the user on the first VR operation interface in the configurable state, a layout of an area in which the function control on the first VR operation interface is located.

Optionally, the first terminal includes a configuration interface for configuring the preset VR operation interface, and the method further includes: The first terminal displays the preset VR operation interface in response to a selection operation by the user on the configuration interface. The first terminal updates, in response to a first update operation by the user on the preset VR operation interface, a mapping relationship between a control function of the first VR sub-application and a function control included in the preset VR operation interface.

Optionally, the method further includes: The first terminal updates, in response to a second update operation by the user on the preset VR operation interface, a layout of an area in which the function control on the preset VR operation interface is located.

Optionally, the method further includes: The first terminal receives a switching instruction from the wearable device, and switches, to a second VR operation interface based on the switching instruction, the VR operation interface that matches the configuration information of the first VR sub-application.

Optionally, that the first terminal configures the first VR operation interface for the wearable device for display includes: The first terminal sends interface configuration information of the first VR operation interface to the wearable device, or sends a picture corresponding to the first VR operation interface to the wearable device, where the picture corresponding to the first VR operation interface includes identification information of a function control included in the first VR operation interface.

Optionally, the wearable device includes a watch and a band, and that the first terminal sends interface configuration information of the first VR operation interface to the wearable device, or sends a picture corresponding to the first VR operation interface to the wearable device includes: If the wearable device is the watch, the first terminal sends the interface configuration information of the first VR operation interface to the wearable device. Alternatively, if the wearable device is the band, the first terminal sends the picture corresponding to the first VR operation interface to the wearable device.

Optionally, the method further includes: The first terminal sends a mapping relationship between the function control included in the first VR operation interface and a control function of the first VR sub-application to the wearable device.

Optionally, the wearable device includes a first wearable device and a second wearable device, and that the first terminal configures the first VR operation interface for the wearable device for display includes: The first terminal splits the first VR operation interface into a first sub-interface and a second sub-interface. The first terminal configures the first sub-interface for the first wearable device for display, and configures the second sub-interface for the second wearable device for display.

According to a second aspect, an embodiment of this application provides a VR interaction apparatus. The apparatus may be used in the first terminal in the first aspect, and is configured to implement the method applied to the first terminal in the first aspect. A function of the apparatus may be implemented by hardware, or may be implemented by hardware executing corresponding software. The hardware or the software includes one or more modules or units corresponding to the foregoing function, for example, a transceiver unit and a processing unit.

When the first terminal starts running a first VR application, the transceiver unit is configured to send a VR start instruction to a wearable device, where the VR start instruction instructs the wearable device to switch from a normal running mode to a VR mode, so that the wearable device displays a VR basic operation interface. The transceiver unit is further configured to receive a first instruction from the wearable device, and the processing unit is configured to start running a first VR sub-application based on the first instruction. The first instruction is sent by the wearable device to the first terminal in response to a first operation by a user on the VR basic operation interface. The first VR sub-application is one of VR sub-applications included in the first VR application. When the first terminal runs the first VR sub-application, the processing unit is further configured to select, from a plurality of preset VR operation interfaces, a first VR operation interface that matches configuration information of the first VR sub-application. The transceiver unit is further configured to configure the first VR operation interface for the wearable device for display. The transceiver unit is further configured to: receive a second instruction from the wearable device, and control, based on the second instruction, the first VR sub-application to execute a first control function, where the second instruction is sent by the wearable device to the first terminal in response to a second operation by the user on the first VR operation interface.

Optionally, the transceiver unit and the processing unit may be further configured to implement other functions of the first terminal in the method according to the first aspect, and details are not listed one by one herein.

According to a third aspect, an embodiment of this application provides a terminal. The terminal may be the foregoing first terminal. For example, the first terminal may be a mobile phone or a tablet computer. The terminal includes a processor and a memory configured to store executable instructions of the processor. When the processor is configured to execute the instructions, the terminal is enabled to implement the method according to the first aspect.

According to a fourth aspect, an embodiment of this application provides a computer-readable storage medium. The computer-readable storage medium stores computer program instructions. When the computer program instructions are executed by an electronic device, the electronic device is enabled to implement the method according to the first aspect.

For beneficial effects of the second aspect to the fourth aspect, refer to the descriptions in the first aspect. Details are not described herein again.

According to a fifth aspect, an embodiment of this application provides a VR interaction method corresponding to the first aspect, and the method is applied to a wearable device. The method includes: The wearable device receives a VR start instruction sent by a first terminal when the first terminal starts running a first VR application. The wearable device switches from a normal running mode to a VR mode based on the VR start instruction, and displays a VR basic operation interface. The wearable device sends a first instruction to the first terminal in response to a first operation by a user on the VR basic operation interface, where the first instruction instructs the first terminal to start running a first VR sub-application, and the first VR sub-application is one of VR sub-applications included in the first VR application. The wearable device receives a first VR operation interface configured by the first terminal for display, where the first VR operation interface is a VR operation interface that is selected by the first terminal from a plurality of preset VR operation interfaces and that matches configuration information of the first VR sub-application. The wearable device sends a second instruction to the first terminal in response to a second operation by the user on the first VR operation interface, where the second instruction instructs the first terminal to control the first VR sub-application to perform a first control function.

Optionally, the method further includes: The wearable device detects and determines a location relationship of a finger of the user relative to the VR basic operation interface. The wearable device sends the location relationship of the finger of the user relative to the VR basic operation interface to the first terminal.

Optionally, the method further includes: The wearable device detects and determines a location relationship of the finger of the user relative to the first VR operation interface. The wearable device sends the location relationship of the finger of the user relative to the first VR operation interface to the first terminal.

Optionally, the method further includes: The wearable device switches the first VR operation interface to a configurable state in response to a configuration trigger operation used for the first VR operation interface. The first terminal sends a first update instruction to the first terminal in response to a first update operation by the user on the first VR operation interface in the configurable state, where the first update instruction instructs the first terminal to update a mapping relationship between a control function of the first VR sub-application and a function control included in the first VR operation interface.

Optionally, the method further includes: The first terminal sends a second update instruction to the first terminal in response to a second update operation by the user on the first VR operation interface in the configurable state, where the second update instruction instructs the first terminal to update a layout of an area in which the function control on the first VR operation interface is located.

Optionally, the method further includes: The wearable device sends a switching instruction to the first terminal in response to a switching operation by the user on the VR operation interface, where the switching instruction instructs the first terminal to switch the VR operation interface that matches the configuration information of the first VR sub-application to a second VR operation interface.

Optionally, that the wearable device receives a first VR operation interface configured by the first terminal for display includes: The wearable device receives interface configuration information of the first VR operation interface from the first terminal, and displays the first VR operation interface based on the interface configuration information. The wearable device receives a picture corresponding to the first VR operation interface from the first terminal and displays the picture, where the picture corresponding to the first VR operation interface includes identification information of a function control included in the first VR operation interface.

Optionally, the wearable device includes a watch and a band.

Optionally, the method further includes: The wearable device receives, from the first terminal, a mapping relationship between the function control included in the first VR operation interface and a control function of the first VR sub-application.

A part of the fifth aspect that has a same beneficial effect as the first aspect is not described herein again.

According to a sixth aspect, an embodiment of this application provides a VR interaction apparatus. The apparatus may be used in the wearable device according to the fifth aspect, and is configured to implement the method applied to the wearable device according to the fifth aspect. A function of the apparatus may be implemented by hardware, or may be implemented by hardware executing corresponding software. The hardware or the software includes one or more modules or units corresponding to the foregoing function, for example, a transceiver unit and a processing unit.

The transceiver unit is configured to: receive a VR start instruction sent by a first terminal when the first terminal starts running a first VR application. The processing unit is configured to: switch from a normal running mode to a VR mode based on the VR start instruction, and display a VR basic operation interface. The processing unit is further configured to send a first instruction to the first terminal via the transceiver unit in response to a first operation by a user on the VR basic operation interface, where the first instruction instructs the first terminal to start running a first VR sub-application, and the first VR sub-application is one of VR sub-applications included in the first VR application. The transceiver unit is further configured to receive a first VR operation interface configured by the first terminal for display, where the first VR operation interface is a VR operation interface that is selected by the first terminal from a plurality of preset VR operation interfaces and that matches configuration information of the first VR sub-application. The processing unit is further configured to send a second instruction to the first terminal via the transceiver unit in response to a second operation by the user on the first VR operation interface, where the second instruction instructs the first terminal to control the first VR sub-application to perform a first control function.

Optionally, the transceiver unit and the processing unit may be further configured to implement other functions of the wearable device in the method according to the fifth aspect, and details are not listed one by one herein.

According to a seventh aspect, an embodiment of this application provides a wearable device. The wearable device may be a watch or a band. The wearable device includes a processor and a memory configured to store executable instructions of the processor. When the processor is configured to execute the instructions, the wearable device is enabled to implement the method according to the fifth aspect.

According to an eighth aspect, an embodiment of this application provides a computer-readable storage medium. The computer-readable storage medium stores computer program instructions. When the computer program instructions are executed by an electronic device, the electronic device is enabled to implement the method according to the fifth aspect.

For beneficial effects of the sixth aspect to the eighth aspect, refer to the descriptions in the fifth aspect. Details are not described herein again.

According to a ninth aspect, an embodiment of this application provides a VR system, including a first terminal and a wearable device. The first terminal is connected to the wearable device. When the first terminal starts running a first VR application, the first terminal sends a VR start instruction to the wearable device. The wearable device switches from a normal running mode to a VR mode based on the VR start instruction, and displays a VR basic operation interface. The wearable device sends a first instruction to the first terminal in response to a first operation by a user on the VR basic operation interface. The first terminal starts running a first VR sub-application based on the first instruction, where the first VR sub-application is one of VR sub-applications included in the first VR application. When the first terminal runs the first VR sub-application, the first terminal selects, from a plurality of preset VR operation interfaces, a first VR operation interface that matches configuration information of the first VR sub-application, and configures the first VR operation interface for the wearable device for display. The wearable device sends a second instruction to the first terminal in response to a second operation by the user on the first VR operation interface, and the first terminal controls, based on the second instruction, the first VR sub-application to perform a first control function.

For beneficial effects of the ninth aspect, refer to the descriptions in the first aspect and the fifth aspect. Details are not described herein again.

DESCRIPTION OF EMBODIMENTS

Figure 1:
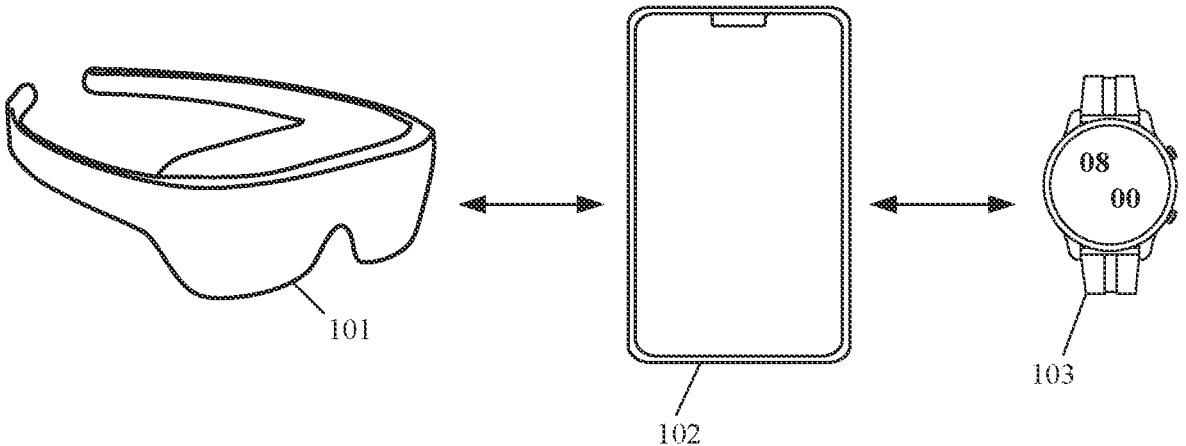
FIG. 1 is a schematic diagram of a VR system according to an embodiment of this application.

VR glasses are also referred to as VR head-mounted display devices or VR head-mounted displays, are products that use a combination of a plurality of technologies such as simulation technologies, computer graphics man-machine interface technologies, multimedia technologies, sensing technologies, and network technologies, and can be used by a user to watch multimedia files or experience VR applications. For example, the user may watch a movie, a music video (music video, MV), play a game, or the like via the VR glasses.

Common VR glasses have a relatively weak interaction capability with a user, and cannot meet a requirement of interaction between the user and the VR glasses. For example, when the user uses the VR glasses to play a game, for some applications with a relatively strong human-computer interaction requirement, the user performs operations relatively frequently. In this case, if merely the VR glasses are used, the interaction requirement between the user and the VR glasses cannot be met.

Currently, to improve the interaction capability between the VR glasses and the user, an external device (referred to as a VR peripheral below) such as a VR handle is set with the VR glasses. The VR peripheral may be connected to the VR glasses, and the user may implement interaction with the VR glasses via the VR peripheral. For example, when the user uses the VR glasses and the VR handle to play a game, the VR handle becomes a tool such as a magic stick, a sword, a flashlight, a paintbrush, or a gray firearm in the corresponding game. The user may implement actions such as selecting, swinging, rolling, capturing, rotating, and shaking via the VR handle, to implement a plurality of game playing manners.

In the foregoing solution in which interaction between the user and the VR glasses is implemented via the VR peripheral, although the interaction capability between the VR glasses and the user can be improved, the VR glasses can be used only after being paired with the VR peripheral. In addition, the VR peripheral is generally large in size and is not easy to carry, resulting in poor user experience.

In this background, an embodiment of this application provides a method for reusing a wearable device such as a watch or a band as a VR peripheral for a user to interact with VR glasses. In the method, the wearable device may have a function of the VR peripheral. When the wearable device establishes a connection to the VR glasses via a mobile phone, the user can interact with the VR glasses by using the wearable device.

According to the method, the wearable device such as a watch or a band are reused as the VR peripheral, so that the user does not need to set a VR peripheral for the VR glasses for pairing, thereby reducing costs of the VR peripheral. In addition, the wearable device such as a watch or a band is reused as the VR peripheral, so that the user can carry the wearable device conveniently, thereby improving user experience.

The following describes embodiments of this application by using examples with reference to the accompanying drawings.

It should be noted that in description of this application, "at least one" means one or more, and "a plurality of" means two or more. Words such as "first" and "second" are merely used for distinguishing and description, and are not used to specially limit a feature. The term "and/or" is used to describe an association relationship for describing associated objects and represents that three relationships may exist. For example, A and/or B may represent the following three cases: Only A exists, both A and B exist, and only B exists. The character "/" generally indicates an "or" relationship between the associated objects.

First, a possible system architecture in embodiments of this application is described.

FIG. 1 is a schematic diagram of a VR system according to an embodiment of this application. In some embodiments, this application may be applied to the VR system shown in FIG. 1. As shown in FIG. 1, the VR system may include VR glasses 101, a mobile phone 102, and a wearable device 103. The mobile phone 102 is separately connected to the VR glasses 101 and the wearable device 103.

Optionally, in the VR system shown in FIG. 1, the VR glasses 101 and the mobile phone 102 may be connected in a wired manner, for example, may be connected through a universal serial bus (universal serial bus, USB). The mobile phone 102 may be wirelessly connected to the wearable device 103. For example, a connection may be established between the mobile phone 102 and the wearable device 103 by using a wireless communication protocol such as a wireless fidelity (wireless fidelity, Wi-Fi) protocol, a Bluetooth (bluetooth) protocol, a ZigBee protocol, a near field communication (near field communication, NFC) protocol, or various cellular network protocols. It should be noted that a connection manner between the VR glasses 101 and the mobile phone 102 and a connection manner between the mobile phone 102 and the wearable device 103 are not limited in this application.

In the VR system shown in FIG. 1, the mobile phone 102 may be used as a host of the VR glasses 101, and the wearable device 103 may establish a connection to the VR glasses 101 via the mobile phone 102, so that a user interacts with the VR glasses 101 by using the wearable device 103.

Figure 2:
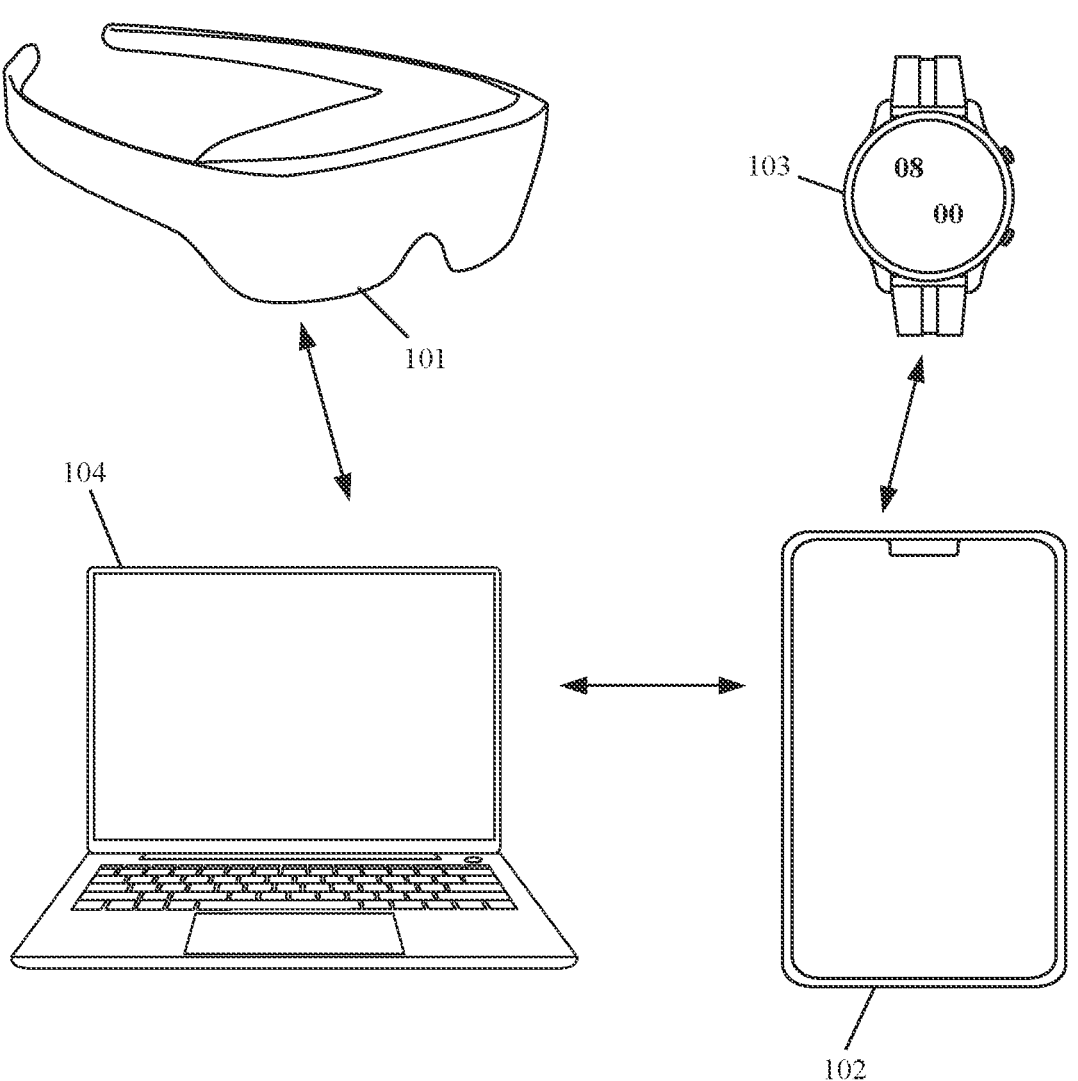
FIG. 2 is another schematic diagram of a VR system according to an embodiment of this application.

FIG. 2 is another schematic diagram of a VR system according to an embodiment of this application. In some other embodiments, this application may also be applied to the VR system shown in FIG. 2. As shown in FIG. 2, based on the VR glasses 101, the mobile phone 102, and the wearable device 103 shown in FIG. 1, the VR system may further include a host 104. The VR glasses 101 are connected to the host 104, the host 104 is connected to the mobile phone 102, and the mobile phone 102 is connected to the wearable device 103.

In some possible implementations, the host 104 may be a personal computer (personal computer, PC), a television, a tablet computer, a smart screen, a game console, a dedicated host of the VR glasses 101, or the like. A specific device form of the host 104 is not limited in this application.

Optionally, in the VR system shown in FIG. 2, the VR glasses 101 may be connected to the host 104 in a wired manner, and the host 104 may also be connected to the mobile phone 102 in a wired manner. The mobile phone 102 may be wirelessly connected to the wearable device 103. For specific implementations of the wired connection and the wireless connection, refer to FIG. 1, and details are not described again. In addition, it should also be noted that a connection manner between the VR glasses 101 and the host 104, a connection manner between the host 104 and the mobile phone 102, and a connection manner between the mobile phone 102 and the wearable device 103 are not limited in this application either.

Different from the VR system shown in FIG. 1, in the VR system shown in FIG. 2, the host 104 is a host of the VR glasses 101. The wearable device 103 may establish a connection to the VR glasses 101 via the mobile phone 102 and the host 104, so that a user interacts with the VR glasses 101 by using the wearable device 103.

In other words, in the VR system shown in FIG. 1, the mobile phone 102 is directly used as a host of the VR glasses 101. For example, when the user needs to use the VR glasses 101 to play a game in the mobile phone 102, the mobile phone 102 may be directly used as the host. However, in the VR system shown in FIG. 2, the host of the VR glasses 101 is the independent host 104. For example, when the user needs to use the VR glasses 101 to play a game in a PC, the PC may be used as the host.

Figure 3:
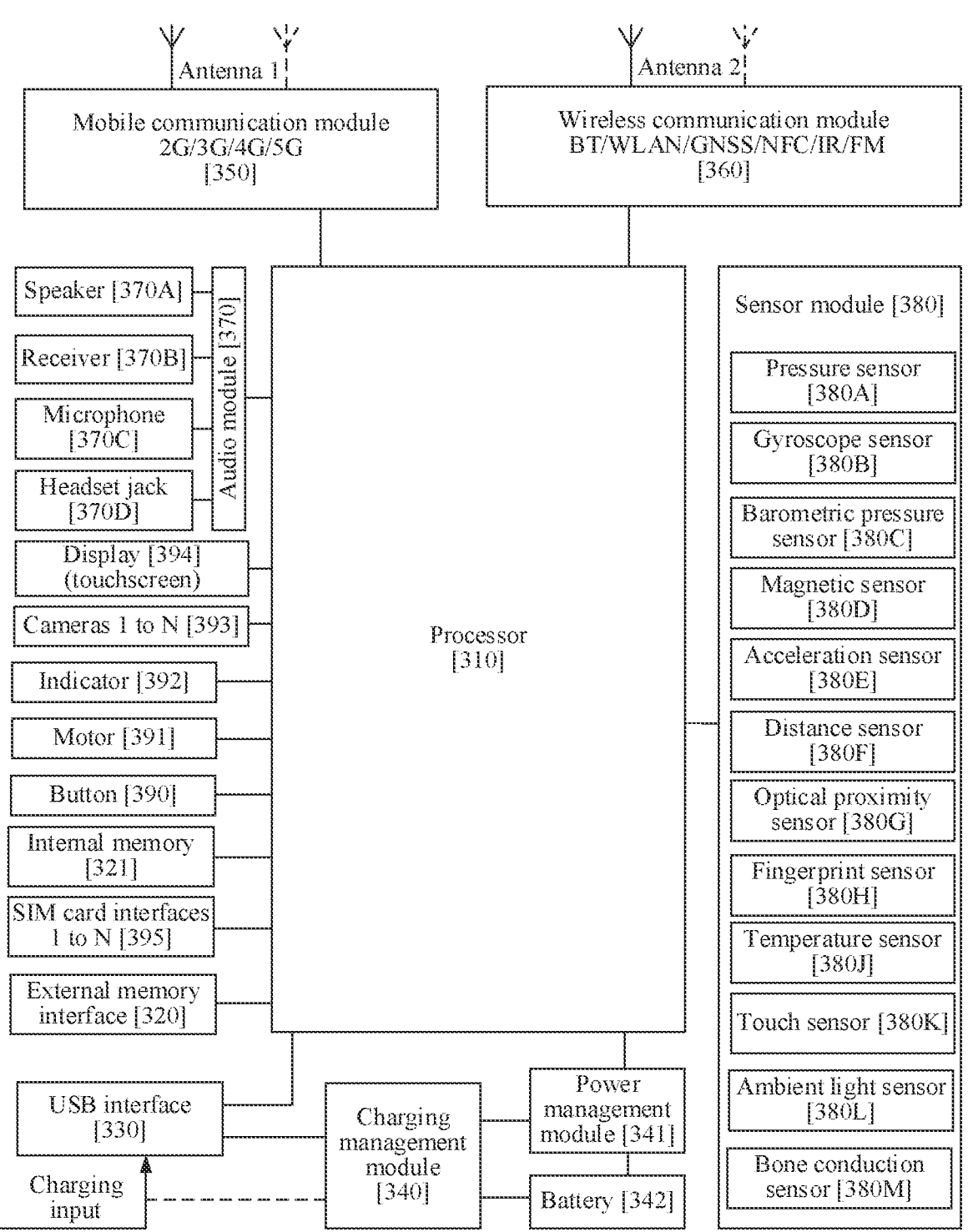
FIG. 3 is a schematic diagram of a structure of an electronic device according to an embodiment of this application.

With reference to FIG. 3, the following describes hardware structures of the foregoing mobile phone, host, VR wearable device, and the like. It should be understood that FIG. 3 provides a hardware structure by using a mobile phone as an example. For hardware structures of the host, the VR wearable device, and the like, refer to the mobile phone. Components are added or reduced based on the structure shown in FIG. 3. In other words, the hardware structures of the host, the VR wearable device, and the like may include fewer structures than those shown in FIG. 3, or may include more structures than those shown in FIG. 3. This is not limited herein.

FIG. 3 is a schematic diagram of a structure of an electronic device according to an embodiment of this application. The electronic device may be a mobile phone. As shown in FIG. 3, the mobile phone may include a processor 310, an external memory interface 320, an internal memory 321, a universal serial bus (universal serial bus, USB) interface 330, a charging management module 340, a power management module 341, a battery 342, an antenna 1, an antenna 2, a wireless communication module 360, an audio module 370, a speaker 370A, a receiver 370B, a microphone 370C, a headset jack 370D, a sensor module 380, a button 390, a motor 391, an indicator 392, a camera 393, a display 394, and the like.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural network processing unit (neural network processing unit, NPU), and/or the like. Different processing units may be independent components, or may be integrated into one or more processors. The controller may be a nerve center and a command center of the mobile phone. The controller may generate an operation control signal based on an instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor may directly invoke the instructions or the data from the memory. This avoids repeated access and reduces a waiting time of the processor 310, thereby improving system efficiency.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, a USB interface, and/or the like.

The external memory interface 320 may be configured to connect to an external memory card, for example, a Micro SD card, to extend a storage capability of the mobile phone. The external memory card communicates with the processor 310 through the external memory interface 320, to implement a data storage function. For example, files such as music and videos are stored in the external memory card.

The internal memory 321 may be configured to store computer-executable program code, and the executable program code includes instructions. The processor 310 executes various function applications and data processing of the mobile phone by running the instructions stored in the internal memory 321. The internal memory 321 may include a program storage area and a data storage area. The program storage area may store an operating system, an application required by at least one function (for example, a sound playing function or an image playing function), and the like. The data storage area may store data (for example, audio data or a phone book) created in a use process of the mobile phone, and the like. In addition, the internal memory 321 may include a high-speed random access memory, and may further include a nonvolatile memory, for example, at least one magnetic disk storage device, a flash memory device, or a universal flash storage (universal flash storage, UFS).

The charging management module 340 is configured to receive a charging input from a charger. The charging management module 340 supplies power to the mobile phone via the power management module 341 while charging the battery 342. The power management module 341 is configured to connect to the battery 342, the charging management module 340, and the processor 310. The power management module 341 may also receive input of the battery 342 to supply power to the mobile phone.

Optionally, the mobile phone may further include a mobile communication module 350, a subscriber identity module (subscriber identification module, SIM) card interface 395, and the like.

A wireless communication function of the mobile phone may be implemented by using the antenna 1, the antenna 2, the mobile communication module 350, the wireless communication module 360, the modem processor, the baseband processor, and the like.

The antenna 1 and the antenna 2 are configured to transmit and receive an electromagnetic wave signal. Each antenna in the mobile phone may be configured to cover one or more communication frequency bands. Different antennas may be further reused, to improve antenna utilization. For example, the antenna 1 may be reused as a diversity antenna of a wireless local area network. In some other embodiments, the antenna may be used in combination with a tuning switch.

When the mobile phone includes the mobile communication module 350, the mobile communication module 350 may provide a solution that includes wireless communication such as 2G/3G/4G/5G and that is applied to the mobile phone. The mobile communication module 350 may include at least one filter, a switch, a power amplifier, a low noise amplifier (low noise amplifier, LNA), and the like. The mobile communication module 350 may receive an electromagnetic wave through the antenna 1, perform processing such as filtering or amplification on the received electromagnetic wave, and transmit a processed electromagnetic wave to the modem processor for demodulation. The mobile communication module 350 may further amplify a signal modulated by the modem processor, and convert an amplified signal into an electromagnetic wave for radiation through the antenna 1. In some embodiments, at least some functional modules in the mobile communication module 350 may be disposed in the processor 310. In some embodiments, at least some functional modules in the mobile communication module 350 may be disposed in a same device as at least some modules in the processor 310.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transferred to the application processor. The application processor outputs a sound signal through an audio device (not limited to the speaker 370A, the receiver 370B, or the like), or displays an image or a video on the display 394. In some embodiments, the modem processor may be an independent component. In some other embodiments, the modem processor may be independent of the processor 310, and is disposed in a same device as the mobile communication module 350 or another functional module.

The wireless communication module 360 may provide a solution that includes wireless communication such as a wireless local area network (wireless local area network, WLAN) (for example, a Wi-Fi network), Bluetooth (bluetooth, BT), a global navigation satellite system (global navigation satellite system, GNSS), frequency modulation (frequency modulation, FM), NFC, and an infrared (infrared, IR) technology and that is applied to the mobile phone. The wireless communication module 360 may be one or more components integrating at least one communication processing module. The wireless communication module 360 receives an electromagnetic wave through the antenna 2, performs frequency modulation and filtering processing on the electromagnetic wave signal, and sends a processed signal to the processor 310. The wireless communication module 36) may further receive a to-be-sent signal from the processor 310, perform frequency modulation and amplification on the signal, and convert the signal into an electromagnetic wave for radiation through the antenna 2.

In some embodiments, in the mobile phone, the antenna 1 and the mobile communication module 350 are coupled, and the antenna 2 and the wireless communication module 360 are coupled, so that the mobile phone can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time division-synchronous code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The mobile phone may implement audio functions, for example, music playing and recording, by using the audio module 370, the speaker 370A, the receiver 370B, the microphone 370C, the headset jack 370D, the application processor, and the like.

The sensor module 380 may include a pressure sensor 380A, a gyroscope sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

The mobile phone may implement a photographing function via the ISP, the camera 393, the video codec, the GPU, the display 394, the application processor, and the like. In some embodiments, the mobile phone may include one or N cameras 393, where N is a positive integer greater than 1.

The display 394 is configured to display an image, a video, and the like. The display 394 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like. In some embodiments, the mobile phone may include one or N displays 394, where N is a positive integer greater than 1.

The mobile phone implements a display function by using the GPU, the display 394, the application processor, and the like. The GPU is a microprocessor for image processing, and is connected to the display 394 and the application processor. The processor 310 may include one or more GPUs that execute program instructions to generate or change display information.

It may be understood that the structure shown in FIG. 3 does not constitute a specific limitation on the mobile phone. In some embodiments, the mobile phone may also include more or fewer components than those shown in FIG. 3, or some components may be combined, or some components may be split, or components may be arranged differently. Alternatively, some components shown in FIG. 3 may be implemented by hardware, software, or a combination of software and hardware.

In the VR system shown in FIG. 1 and/or FIG. 2, the wearable device may be a device such as a watch or a band. An example in which the wearable device is a watch is used below to describe, based on the structure of the VR system shown in FIG. 1, specific implementation of reusing the wearable device as a VR peripheral for interaction between a user and VR glasses.

For example, in this embodiment of this application, the VR glasses may establish a connection to a mobile phone, and the mobile phone may establish a connection to the watch.

The mobile phone may include at least one VR application, and the user may perform a start operation on one VR application (where the first VR application is used as an example below). For example, the operation of starting the first VR application may be a tap operation, a voice control operation, or the like. The mobile phone may start running the first VR application in response to the start operation by the user on the first VR application. Modes of the watch may include a VR mode and a normal running mode. In the normal running mode, the watch provides functions such as heart rate measurement, music playback, and call making for the user when being used. In the VR mode, the watch shields functions in the normal running mode, and provides only VR-related functions for the user (for the VR-related functions, refer to the following embodiments). When the mobile phone runs the first VR application and the VR mode of the watch is enabled, the watch may be reused as a VR peripheral, so that the user can interact with the VR glasses.

In some embodiments, when the mobile phone runs the first VR application, if the connection to the watch is detected, the watch may be directly triggered to enter the VR mode. For example, when the first VR application starts, the mobile phone may send a VR start instruction to the watch, to instruct the watch to switch from the normal running mode to the VR mode. After receiving the VR start instruction, the watch switches from the normal running mode to the VR mode. When the first VR application is closed, the mobile phone may send a VR close instruction to the wearable device, to instruct the watch to switch from the VR mode to the normal running mode. After receiving the VR close instruction (or disconnecting from the mobile phone), the watch switches from the VR mode to the normal running mode.

Optionally, the VR start instruction and/or the VR close instruction may also be another indication message having a same indication function. This is not limited herein. In addition, it may be understood that, in a normal use state (when no VR start instruction is received), the watch is in the normal running mode.

In some other embodiments, when the mobile phone runs the first VR application, the user needs to select, on the watch, to enter the VR mode. For example, the watch has a function for the user to select to enter the VR mode. For example, the function may be implemented by "Press the watch crown" or "Press the watch face" of the watch. The watch may enter the VR mode in response to a touch control operation (for example, touching and holding for 3 seconds) performed by the user on "Press the watch crown", "Press the watch face", or the like. Similarly, the user may also quit the VR mode (switch to the normal running mode) in response to a touch control operation by the user on "Press the watch crown", "Press the watch face", or the like. An implementation in which the watch enters the VR mode is not limited herein.

Figure 4:
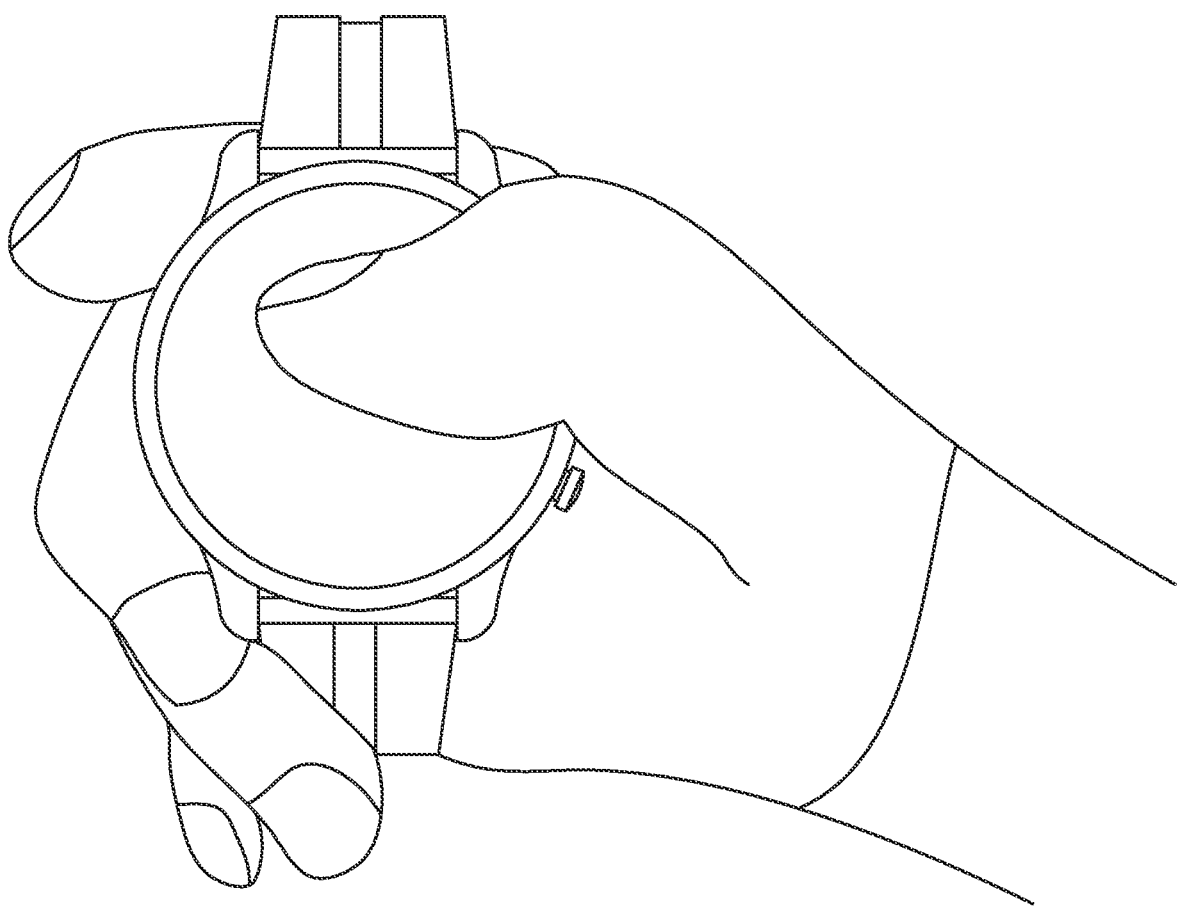
FIG. 4 is a schematic diagram of a scenario in which a user uses a watch according to an embodiment of this application.

FIG. 4 is a schematic diagram of a scenario in which a user uses a watch according to an embodiment of this application. As shown in FIG. 4, after a mobile phone enters a VR mode, the user may hold the watch in hand to interact with VR glasses.

In this embodiment of this application, the watch in the VR mode may provide a VR basic operation interface for the user on a watch face. The user may perform an operation such as tap or slide on the VR basic operation interface provided by the watch. The watch may send a corresponding operation instruction to a mobile phone in response to the operation performed by the user on the VR basic operation interface. The mobile phone may control, based on the received operation instruction, a first VR application to perform a corresponding function.

In some implementations, the VR basic operation interface may include a function control used to implement a function such as "confirm", "back", or "move up/down/left/right". The user may perform an operation (for example, a tap operation or a slide operation) on the function control on the VR basic operation interface, and the watch may send a corresponding operation instruction to the mobile phone in response to the operation performed by the user on the function control on the VR basic operation interface. The mobile phone may control, based on the received operation instruction, the first VR application to perform the corresponding function.

Figure 5:
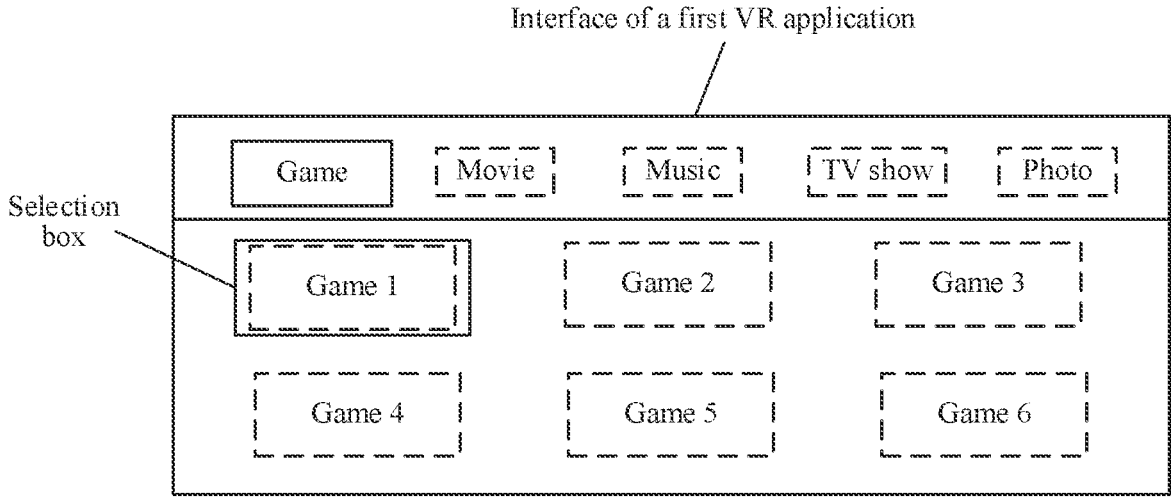
FIG. 5 is a schematic diagram of a first VR application according to an embodiment of this application.
Figure 6:
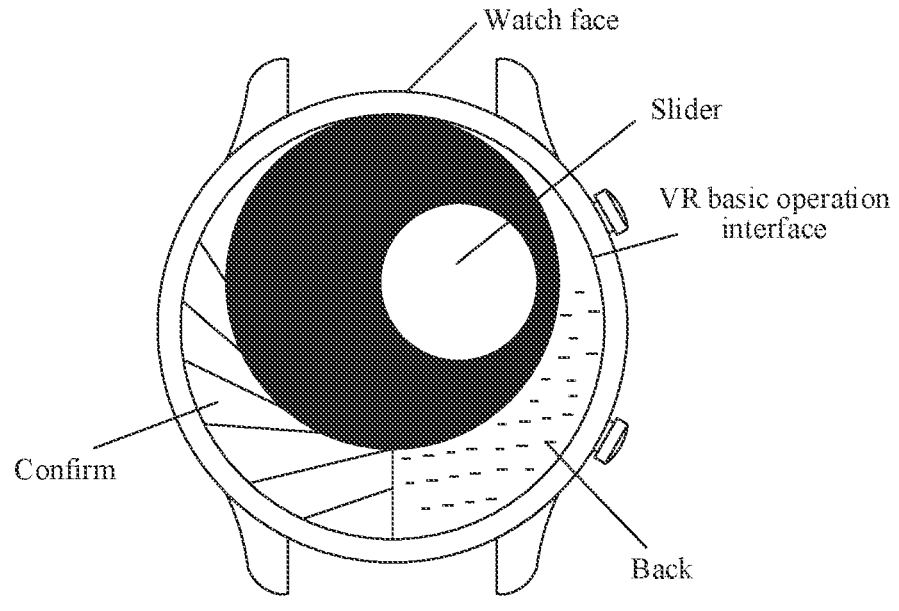
FIG. 6 is a schematic diagram of a VR basic operation interface according to an embodiment of this application.

For example, it is assumed that an interface displayed after the first VR application on the mobile phone starts is shown in FIG. 5, and includes function controls of a plurality of classification tags such as a game, a movie, music, a TV show, and a photo. The game is used as an example. The game classification tag may further include function controls of a plurality of game applications such as game 1, game 2, and game 3. In addition, the interface of the first VR application further includes a selection box. The VR basic operation interface provided by the watch in the VR mode is shown in FIG. 6, and includes three function controls: a slider, "confirm", and "back". The slider may slide in four different directions such as up/down/left/right in an area in which a black filled circle shown in FIG. 6 is located.

Still refer to FIG. 5 and FIG. 6. An example in which the selection box on the interface of the first VR application is above the function control of game 1 is used. If the user taps the function control of "confirm" on the VR basic operation interface provided by the watch, after receiving an operation instruction (which may be referred to as a first instruction) corresponding to the tap operation, the mobile phone starts running game 1, and switches a display interface from the interface of the first VR application to an interface of game 1. If the user taps the function control of "back" on the VR basic operation interface provided by the watch, after receiving an operation instruction corresponding to the tap operation, the mobile phone may quit the first VR application, or prompt the user whether to quit the first VR application, and quit or not quit based on a selection of the user. If the user drags the slider on the VR basic operation interface provided by the watch to move in a direction of up, down, left, or right, after receiving an operation instruction corresponding to the sliding operation, the mobile phone controls the selection box to move in a direction that is the same as the moving direction of the slider. For example, if the user drags the slider to the right once, the selection box moves from the function control of game 1 to the function control of game 2.

It may be understood that the selection box has a function of selecting a function control on the interface of the first VR application. However, it should be noted that the selection box is merely an example implementation, and this is not limited herein. For example, when a function control is selected on the interface of the first VR application, a selection box may not be displayed, but the function control is displayed differently from another function control, for example, zoomed in or shifted upward.

Alternatively, in some other implementations, the VR basic operation interface provided by the watch may include only identification information of function controls with functions such as "confirm", "back", and "move up/down/left/right", that is, the identification information of these function controls does not have functions of the actual function controls. A correspondence between the function control with the function such as "confirm", "back", and "move up/down/left/right" and a location coordinate or an area coordinate of the identification information included in the VR basic operation interface may be preset in the mobile phone. When the user performs, on the VR basic operation interface, an operation (for example, a tap operation) on an area in which identification information is located, the watch may detect the operation performed by the user on the area (for example, may detect the operation via a pressure sensor), and send a corresponding operation instruction to the mobile phone in response to the operation performed by the user on the area. In this case, the operation instruction includes the identification information of the area. After receiving the operation instruction, the mobile phone may determine, based on the identification information in the operation instruction, a function control corresponding to the identification information, so as to control, based on a function corresponding to the function control, the first VR application to perform the corresponding function. A specific principle is similar to that in the foregoing implementation, and details are not described again. It should be noted that, in the following examples, an implementation in which the VR basic operation interface includes the function controls is used as an example for description, but this is not limited.

Alternatively, in some other implementations, the watch may further detect acceleration data of the watch via an acceleration sensor, to implement control of a function such as "move up/down/left/right". For example, when the user controls the watch to move in different directions such as up/down/left/right, the watch may determine the movement direction based on the acceleration data detected by the acceleration sensor, so as to send a corresponding operation instruction to the mobile phone.

With reference to the foregoing example, it can be learned that in this embodiment of this application, the user may perform an operation on the VR basic operation interface provided by the watch, to enable the mobile phone to start running a specific game, video, photo, or the like in the first VR application. The following continues to provide descriptions by using an example in which game 1 in the first VR application starts running in the foregoing example. In this embodiment of this application, game 1 may also be referred to as a first VR sub-application.

In this embodiment of this application, the mobile phone further stores a plurality of preset VR operation interfaces (different from the foregoing VR basic operation interfaces). These VR operation interfaces are interfaces that can be provided by the watch (or may be understood as interfaces that can be displayed on a watch face of the watch). Each VR operation interface includes at least one function control, and different VR operation interfaces may include different quantities and types of function controls. The mobile phone may obtain configuration information of game 1 after the mobile phone starts running game 1 (or the mobile phone may obtain the configuration information when game 1 starts). The configuration information of game 1 may be configured by a developer of game 1 in an application package or a plug-in package of game 1. Then, the mobile phone may select, based on the configuration information of game 1, a first VR operation interface that matches the configuration information of game 1 from the plurality of preset VR operation interfaces, and configure the first VR operation interface for the watch for display. The user may perform an operation (whose operation type is not limited) on a function control on the first VR operation interface provided by the watch, to enable the mobile phone to control execution of a corresponding control function in game 1.

For example, the VR operation interfaces preset in the mobile phone may be shown in FIG. 7 to FIG. 11.

Figure 7:
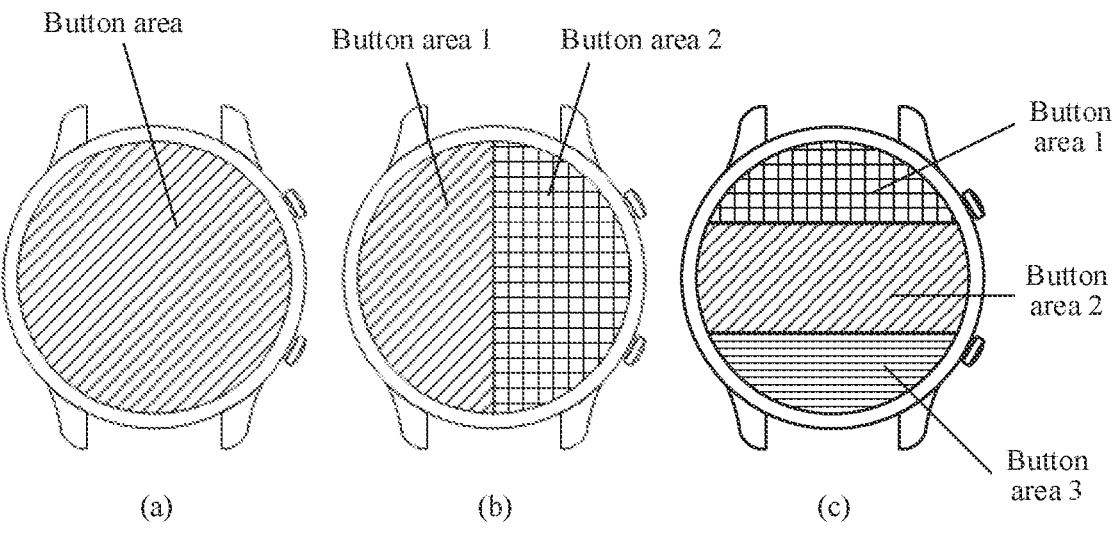
FIG. 7 is a schematic diagram of a VR operation interface according to an embodiment of this application.

Refer to FIG. 7. In a possible design, the VR operation interface may include at least one function control similar to a button. If an area in which each function control is located is referred to as a button area, it may be considered that the watch face may be configured as at least one button area, for example, one button area shown in (a) in FIG. 7, two button areas (button area 1 and button area 2) shown in (b) in FIG. 7, and three button areas (button area 1, button area 2, and button area 3) shown in (c) in FIG. 7.

Similarly, the VR operation interface may further include another N (where N is a positive integer greater than or equal to 4) function controls, and the watch face may be correspondingly configured as another N button areas. In this embodiment of this application, other quantities of button areas are not shown one by one.

Figure 8:
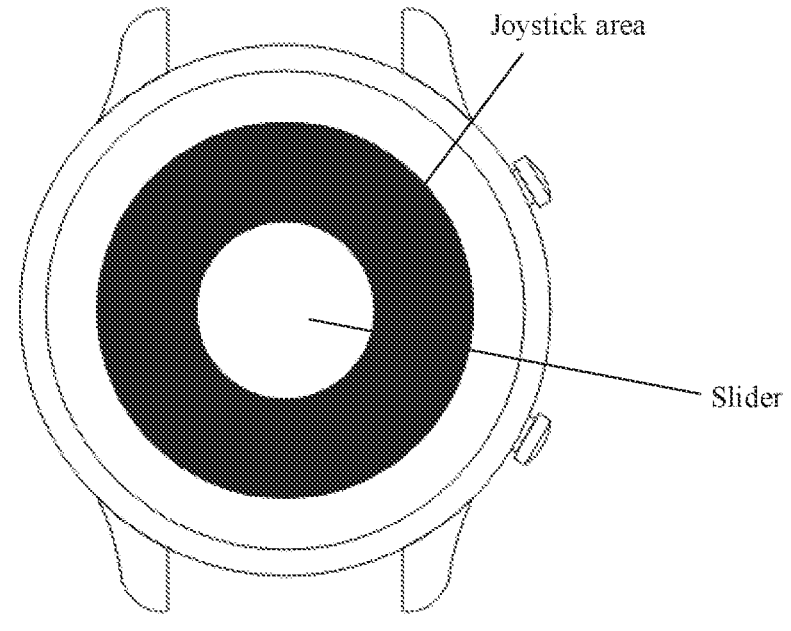
FIG. 8 is another schematic diagram of a VR operation interface according to an embodiment of this application.

Refer to FIG. 8. In another possible design, the VR operation interface may also include a function control similar to a joystick. For example, the VR operation interface may include a joystick area, and the joystick area includes a slider. When the slider moves in the joystick area, a function similar to joystick movement may be implemented (which is similar to that in the foregoing VR basic operation interface).

Figure 9:
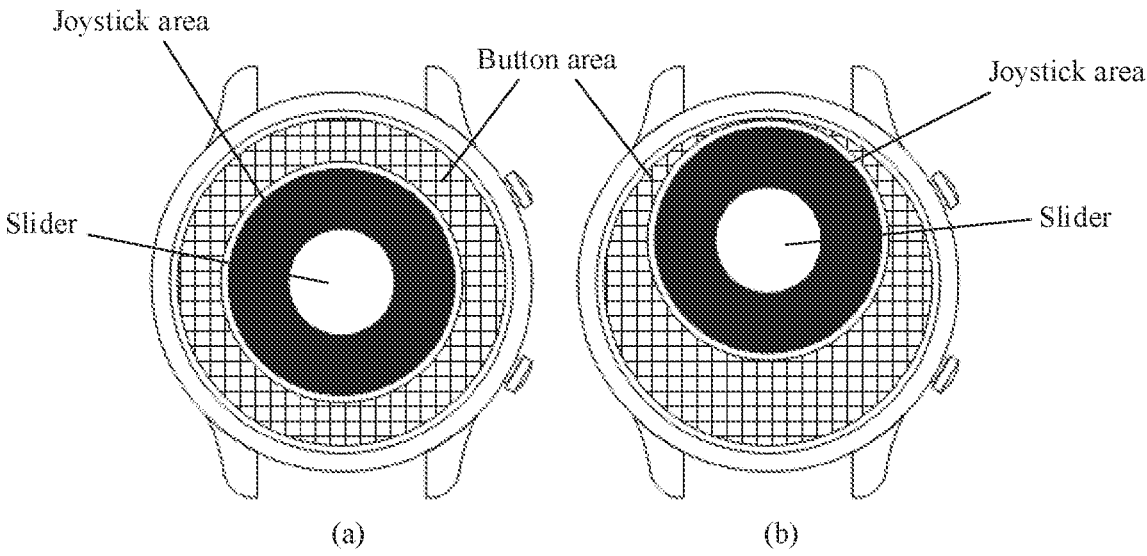
FIG. 9 is still another schematic diagram of a VR operation interface according to an embodiment of this application.

As shown in FIG. 9, in still another possible design, the VR operation interface may further include a combination of a function control similar to a joystick and a function control similar to a button. For example, a button area in which the function control similar to the button is located in the VR operation interface may be disposed around a joystick area in a manner shown in (a) in FIG. 9 or (b) in FIG. 9. This is not limited herein.

Figure 10:
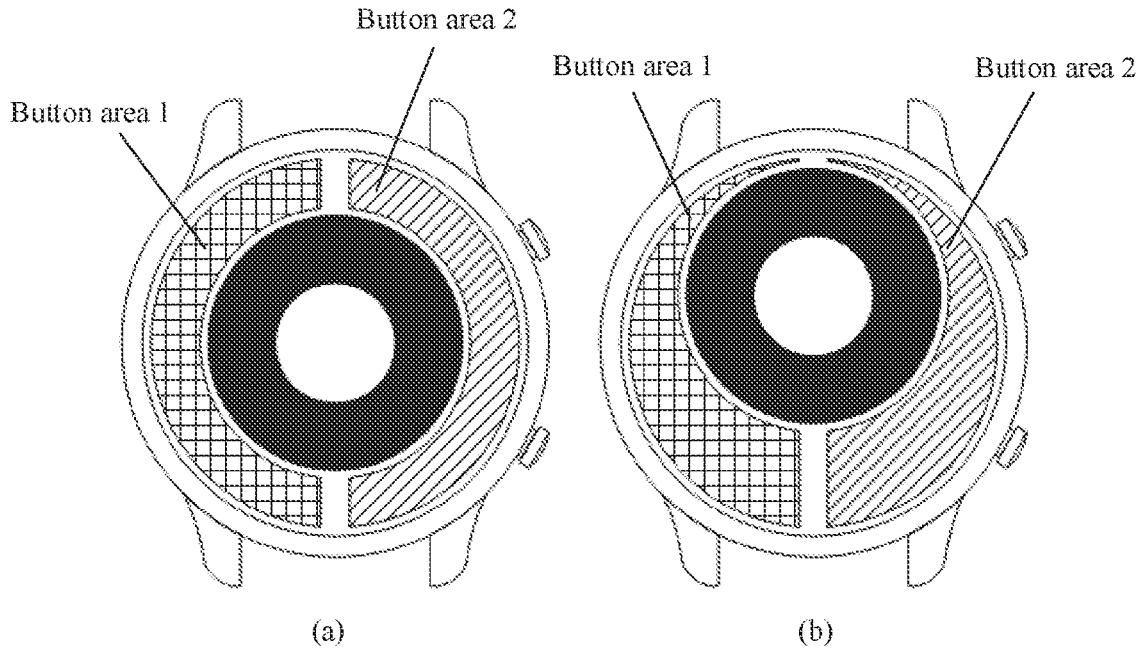
FIG. 10 is still another schematic diagram of a VR operation interface according to an embodiment of this application.
Figure 11:
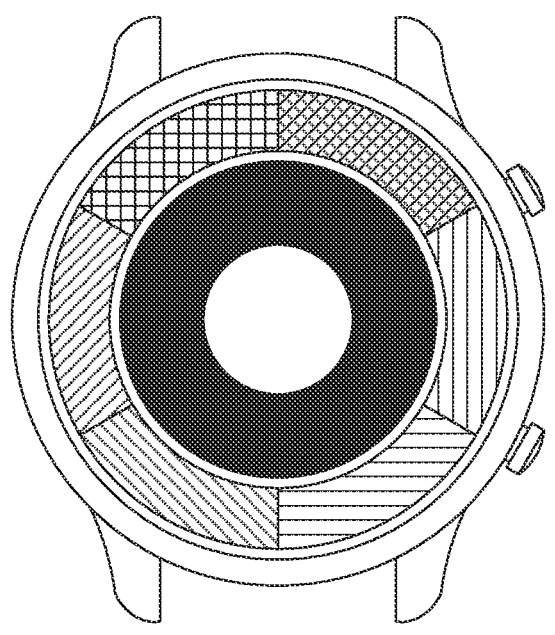
FIG. 11 is still another schematic diagram of a VR operation interface according to an embodiment of this application.

In still another possible design, in a scenario of the combination of the function control similar to the joystick and the function control similar to the button, a quantity of function controls similar to the joystick in the VR operation interface may be two shown in FIG. 10 or more shown in FIG. 11 (where more means that the quantity is greater than or equal to 3, and FIG. 11 gives an example of six function controls). This is not limited herein either. In addition, it can be seen that (a) in FIG. 9 and (b) in FIG. 9 provide two different layout manners of the button area as examples. It should be noted that the present invention does not limit layout manners of two or more button areas either.

It is assumed that the mobile phone stores the plurality of VR operation interfaces shown in FIG. 7 to FIG. 11. After obtaining the configuration information of game 1, the mobile phone may select, from the plurality of VR operation interfaces shown in FIG. 7 to FIG. 11 and based on the configuration information of game 1, the first VR operation interface that matches the configuration information of game 1.

For example, the configuration information of game 1 includes options and a quantity of control functions of game 1. It is assumed that the configuration information of game 1 includes six control functions shown in the following Table 1. The control functions 1 to 4 are used to control movement of a virtual object in game 1, and the control functions 5 and 6 are used to control the virtual object to release different skills. The virtual object may be a virtual character, a virtual hero, a virtual vehicle, or the like of game 1. Virtual objects in different games are different. This is not limited herein.

TABLE 1

| Number | Type |
| --- | --- |
| Control function 1 | Move up |
| Control function 2 | Move down |
| Control function 3 | Move left |
| Control function 4 | Move right |
| Control function 5 | Release skill 1 |
| Control function 6 | Release skill 2 |

After obtaining the configuration information of game 1 shown in Table 1, the mobile phone may perform matching between the control functions included in the configuration information of game and the stored plurality of VR operation interfaces one by one, to determine the first VR operation interface whose included function controls can match the control functions of game 1. Matching means that function controls included in a VR operation interface can meet a requirement for implementing the control functions of game 1, or a mapping relationship between the control functions of game 1 and function controls included in a VR operation interface can be established.

For example, the mobile phone may determine that the VR operation interface shown in FIG. 10 can match the configuration information of game 1 shown in Table 1. An example is used in which the mobile phone determines that the first VR operation interface corresponding to the control functions of game 1 is shown in (a) in FIG. 10 (or may determine that the first VR operation interface is shown in (b) in FIG. 10, which is not limited). A mapping relationship between the control functions of game 1 and the function controls included in the first VR operation interface may be shown in the following Table 2.

TABLE 2

| Number | Type | Function control |
| --- | --- | --- |
| Control function 1 | Move up | Slider (slide up) |
| Control function 2 | Move down | Slider (slide down) |
| Control function 3 | Move left | Slider (slide left) |

TABLE 2-continued

| Number | Type | Function control |
| --- | --- | --- |
| Control function 4 | Move right | Slider (slide right) |
| Control function 5 | Release skill 1 | A |
| Control function 6 | Release skill 2 | B |

Optionally, an area in which the function control A shown in Table 2 is located may be button area 1 shown in (a) in FIG. 10, and an area in which the function control B is located may be button area 2 shown in (a) in FIG. 10. Alternatively, areas in which the function controls A and B are located may be interchanged.

As shown in Table 2, the control functions 1 to 4 of game 1 may be implemented by sliding up/down/left/right of the slider on the first VR operation interface, and the control functions 5 and 6 may be implemented via the function controls A and B on the first VR operation interface.

After determining the first VR operation interface that matches the configuration information of game 1, the mobile phone may establish and store the mapping relationship shown in Table 2, and a storage form is not limited (for example, may be a form of a table). Then, the mobile phone may configure (or may be understood as send) the first VR operation interface for the watch for display. Optionally, similar to the VR basic operation interface, the mobile phone herein may send, to the watch, the first VR operation interface that includes the function control, or may send, to the watch, the first VR operation interface that includes only identification information of the function control. This is not limited herein.

Optionally, in some embodiments, the mobile phone may determine a wearable device connected to the mobile phone, and determine, based on a type of the wearable device, whether to send the first VR operation interface/VR basic operation interface including the function control or the first VR operation interface/VR basic operation interface including only the identification information of the function control to the wearable device. For example, when detecting that a watch is connected, the mobile phone may send the first VR operation interface/R basic operation interface including the function control to the watch. When detecting that a band is connected, the mobile phone may send the first VR operation interface/VR basic operation interface including the identification information of the function control to the band.

The following also uses an example in which the first VR operation interface displayed by the watch includes the function control for description.

When the user performs an operation on a function control on the first VR operation interface provided by the watch, the watch may send an operation instruction (which may be referred to as a second instruction) to the mobile phone in response to the operation by the user on the function control. After receiving the operation instruction, the mobile phone may control, based on the mapping relationship shown in Table 2, the virtual object in game 1 to perform a corresponding control function (which may be referred to as a first control function in this embodiment of this application).

Figure 12:
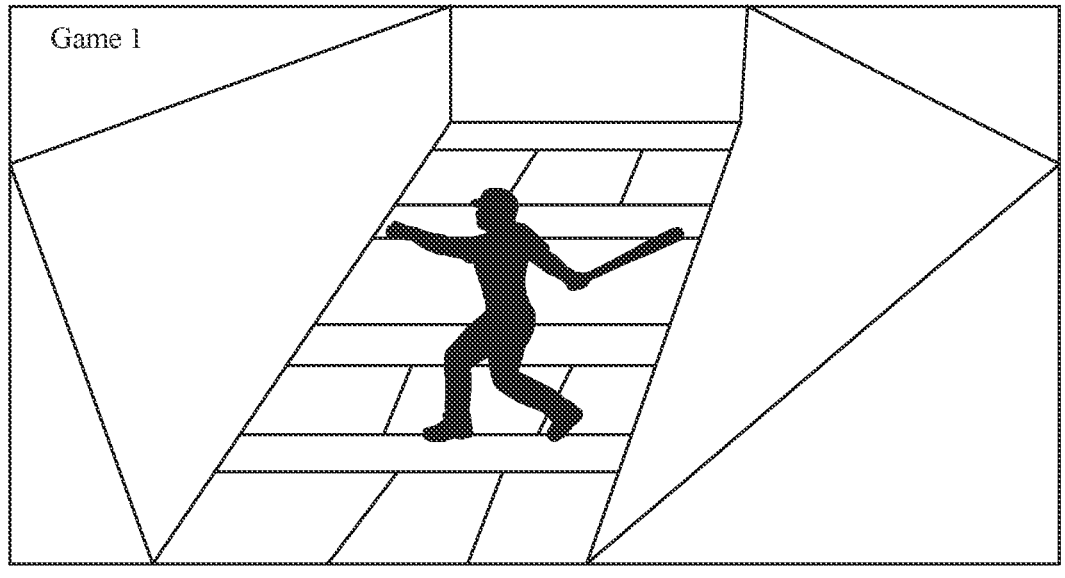
FIG. 12 is a schematic diagram of an interface of game 1 according to an embodiment of this application.
Figure 13:
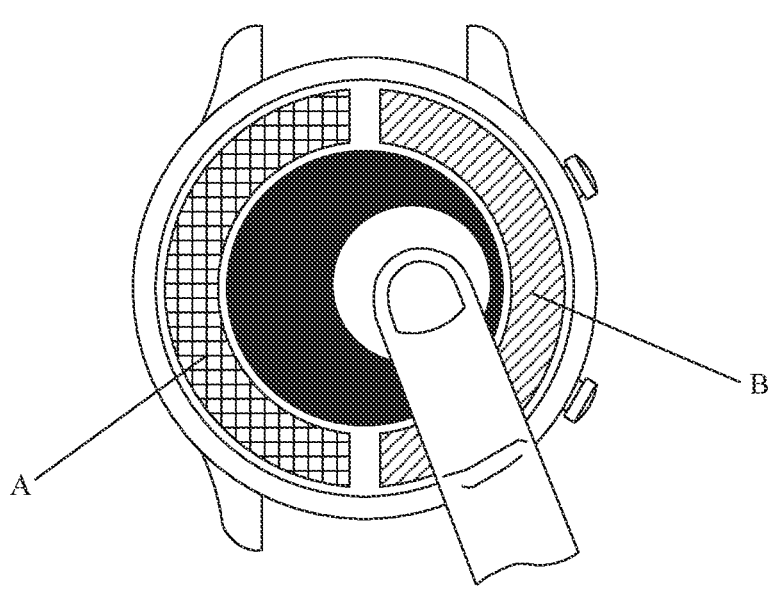
FIG. 13 is a schematic diagram in which a slider is dragged according to an embodiment of this application.

For example, FIG. 12 is a schematic diagram of an interface of game 1 according to an embodiment of this application, and FIG. 13 is a schematic diagram of dragging a slider according to an embodiment of this application. As shown in FIG. 12 and FIG. 13, game 1 includes a virtual object (where a virtual character is provided in FIG. 12 as an example). When the user drags the slider to the right on the first VR operation interface provided by the watch, the mobile phone controls the virtual object in game 1 to move to the right side. Alternatively, when the user taps the function control A on the first VR operation interface provided by the watch, the mobile phone controls the virtual object in game 1 to perform a function of releasing the skill 1.

Optionally, in some embodiments, when configuring the first VR operation interface for the watch, the mobile phone also configures the mapping relationship shown in Table 2 for the watch. The operation instruction sent by the watch to the mobile phone in response to the operation by the user on the function control can indicate a control function that needs to be performed or the function control operated by the user. In some other embodiments, the mobile phone may configure only the first VR operation interface for the watch, and the operation instruction sent by the watch to the mobile phone in response to the operation by the user on the function control indicates only the function control operated by the user. This is not limited herein.

Optionally, when the mobile phone cannot select, from the plurality of preset VR operation interfaces based on the configuration information of game 1, the first VR operation interface that matches the configuration information of game 1, the mobile phone may further download, from a server, the first VR operation interface that can match the configuration information of game 1. For example, the mobile phone may be connected to the server, and the service may be referred to as a proxy server. The server may include VR operation interfaces of more types. These VR operation interfaces may be uploaded by the user to the server, or may be provided by a service provider of a VR application. This is not limited herein. After obtaining the configuration information of game 1, the mobile phone may first determine whether the first VR operation interface that matches the configuration information of game 1 can be selected from the plurality of preset local (which means in the mobile phone) VR operation interfaces. If the first VR operation interface can be selected, the first VR operation interface is directly determined. If the first VR operation interface that matches the configuration information of game 1 cannot be selected from the plurality of preset local VR operation interfaces, the mobile phone downloads, from the server, the first VR operation interface that can match the configuration information of game 1. It may be understood that the VR operation interface in the server may be continuously updated. Optionally, the VR operation interfaces preset in the mobile phone may also be periodically updated based on the VR operation interface in the server. An update process may be initiated by the mobile phone, or may be initiated by the server. This is not limited either.

Figures 14A, 14B:
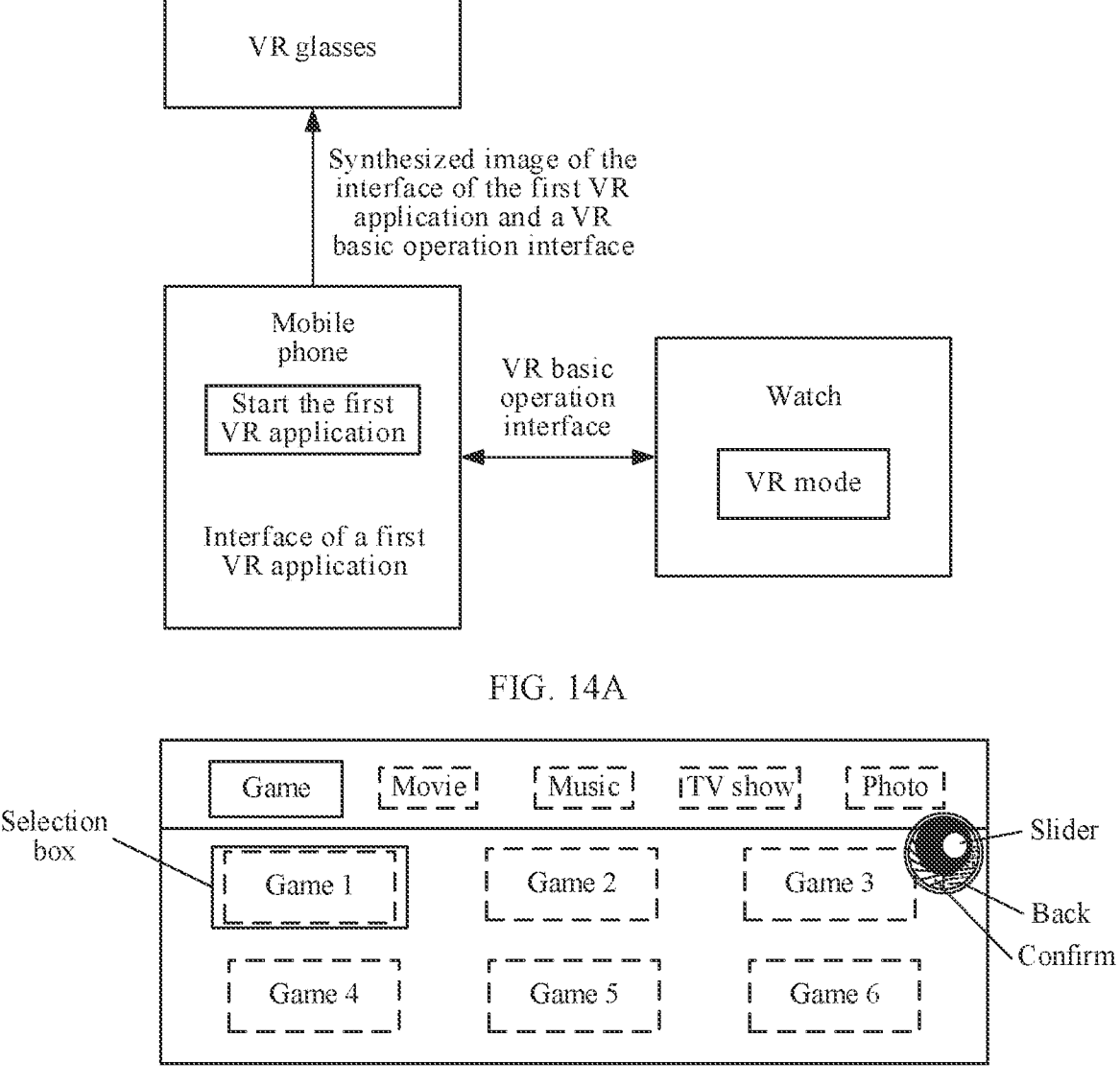
FIG. 14A is a schematic interaction flowchart according to an embodiment of this application.
FIG. 14B is a schematic diagram of a VR field of view according to an embodiment of this application.

For example, FIG. 14A is a schematic interaction flowchart according to an embodiment of this application. As shown in FIG. 14A, in this embodiment of this application, after a mobile phone starts a first VR application and a watch is switched to a VR mode, the mobile phone may perform synthesis and rendering on an interface of the first VR application and a VR basic operation interface displayed on a watch face of the watch, and send a synthesized image to VR glasses, and display the synthesized image in a VR field of view of the VR glasses for a user to watch. The VR basic operation interface may be sent by the watch to the mobile phone, or may be stored in the mobile phone in advance. This is not limited.

For example, the mobile phone may obtain the interface of the first VR application shown in FIG. 5 and the VR basic operation interface shown in FIG. 6. After the mobile phone performs rendering and synthesis on the interface of the first VR application shown in FIG. 5 and the VR basic operation interface shown in FIG. 6, a synthesized image obtained may be shown in FIG. 14B. The interface of the first VR application covers the entire VR field of view, and the VR basic operation interface may be suspended on the right side or in the upper right corner of the VR field of view (herein, the suspension means that the VR basic operation interface is displayed above the interface of the first VR application).

In some embodiments, when the interface of the first VR application and the VR basic operation interface change, the mobile phone performs synthesis and rendering for a new image in a timely manner to update the image in the VR field of view. For example, when the user performs an operation on a function control (including a slider, "confirm", and "back") on the VR basic operation interface provided by the watch, a change of the operated function control on the VR basic operation interface provided by the watch is also displayed in the VR field of view. For example, when the user taps "confirm", an area where the "confirm" is located may be darkened or brightened; when the user drags the slider, the slider moves. The mobile phone may update, based on changes of these function controls on the VR basic operation interface, VR basic operation interface displayed in the VR glasses, so as to present change effects of these function controls to the user, so that the user can more intuitively view feedback on the operation on the function control in the VR glasses. In other words, when the user wears the VR glasses, the user may not be able to directly view the watch face of the watch when operating the watch, but may see, from the field of view of the VR glasses, the operation performed by the user on the watch face of the watch.

Figure 15:
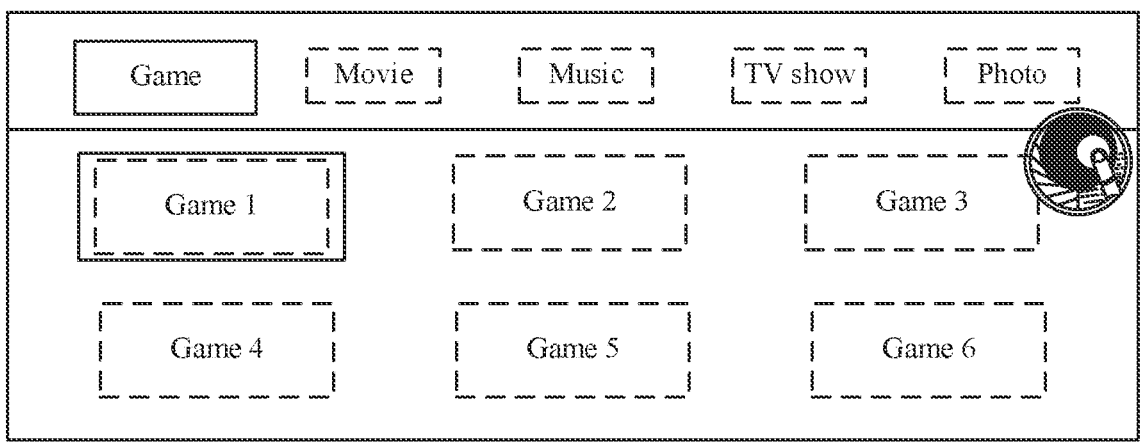
FIG. 15 is another schematic diagram of a VR field of view according to an embodiment of this application.

In some other embodiments, when the user performs an operation (for example, a tap operation) on the VR basic operation interface, the watch may detect the operation by the user on a function control on the VR basic operation interface (for example, may detect the operation via a pressure sensor), determine a location relationship of a finger of the user relative to the VR basic operation interface, and send the location relationship to the mobile phone. When performing synthesis and rendering on the interface of the first VR application and the VR basic operation interface, the mobile phone may generate a virtual finger, and display the virtual finger in a synthesized image based on the location relationship of the finger of the user relative to the VR basic operation interface. For example, as shown in FIG. 15, when the location relationship of the finger of the user relative to the VR basic operation interface is that the finger stays on a function control, in the synthesized image, the virtual finger is correspondingly displayed above the function control. Based on the location relationship of the virtual finger relative to the VR basic operation interface, the user can intuitively view the operation performed by the user on the watch face of the watch.

Figure 16:
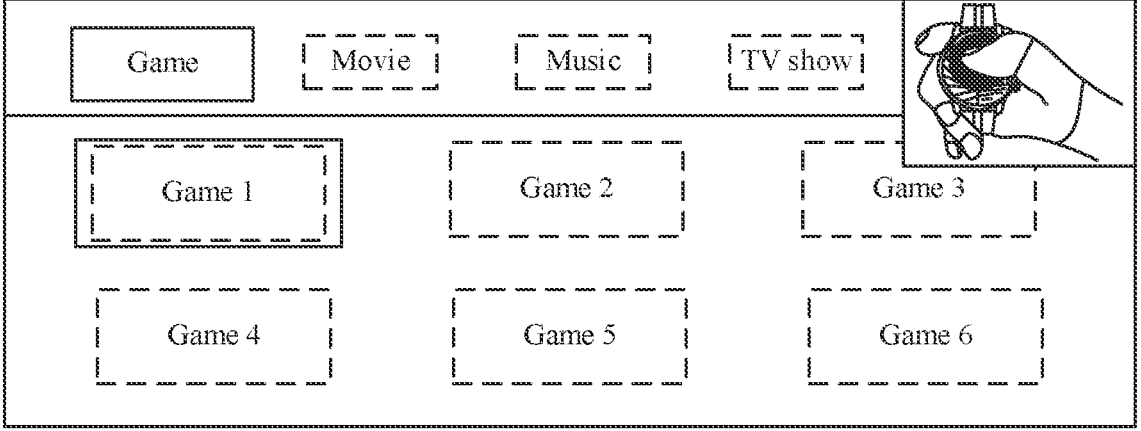
FIG. 16 is still another schematic diagram of a VR field of view according to an embodiment of this application.

In some other embodiments, a camera may be installed on the VR glasses. When the user holds the watch in hand to interact with the VR glasses, the camera may be configured to capture a video image in which the user holds the watch in hand, and send the video image to the mobile phone. The mobile phone performs synthesis and rendering on the interface of the first VR application and the video image (for example, in this case, the VR basic operation interface is no longer used for synthesis), and displays a synthesized image in the VR field of view. For example, as shown in FIG. 16, when the user holds the watch in hand to interact with the VR glasses, the video image in which the user holds the watch in hand and that is captured by the camera is displayed in the synthesized image. Based on the video image, the user may also intuitively view the operation performed by the user on the watch face of the watch.

Similarly, in this embodiment of this application, after the mobile phone starts game 1, and a display interface of the watch face of the watch is switched from the VR basic operation interface to the first VR operation interface that matches the configuration information of game 1, the mobile phone also performs synthesis and rendering on the interface of game 1 and the first VR operation interface provided by the watch, and sends a synthesized image to the VR glasses, and displays the synthesized image in the VR field of view of the VR glasses. In this case, the user may see, in the VR field of view, the interface of game 1 and the first VR operation interface provided by the watch.

For example, the mobile phone may obtain the interface of game 1 shown in FIG. 12 and the first VR operation interface shown in (a) in FIG. 10. After the mobile phone renders and synthesizes the interface of game 1 shown in FIG. 12 and the first VR operation interface shown in (a) in FIG. 10, the obtained synthesized image may be shown in FIG. 17. The interface of game 1 covers the entire VR field of view, and the first VR operation interface may be suspended on the right side or in the upper right corner of the VR field of view (herein, the suspension means that the first VR operation interface is displayed above the interface of game 1).

Similar to related descriptions of the foregoing VR basic operation interface, in some embodiments, when the interface of game 1 and the first VR operation interface change, the mobile phone performs synthesis and rendering for a new image in a timely manner to update the image in the VR field of view. For example, when the user performs an operation on a function control (such as a slider, A, or B) on the first VR operation interface provided by the watch, a change of the operated function control on the first VR operation interface provided by the watch is also displayed in the VR field of view. A specific principle or effect is similar to or the same as that of the VR basic operation interface described in the foregoing embodiments, and details are not described again.

Figure 18:
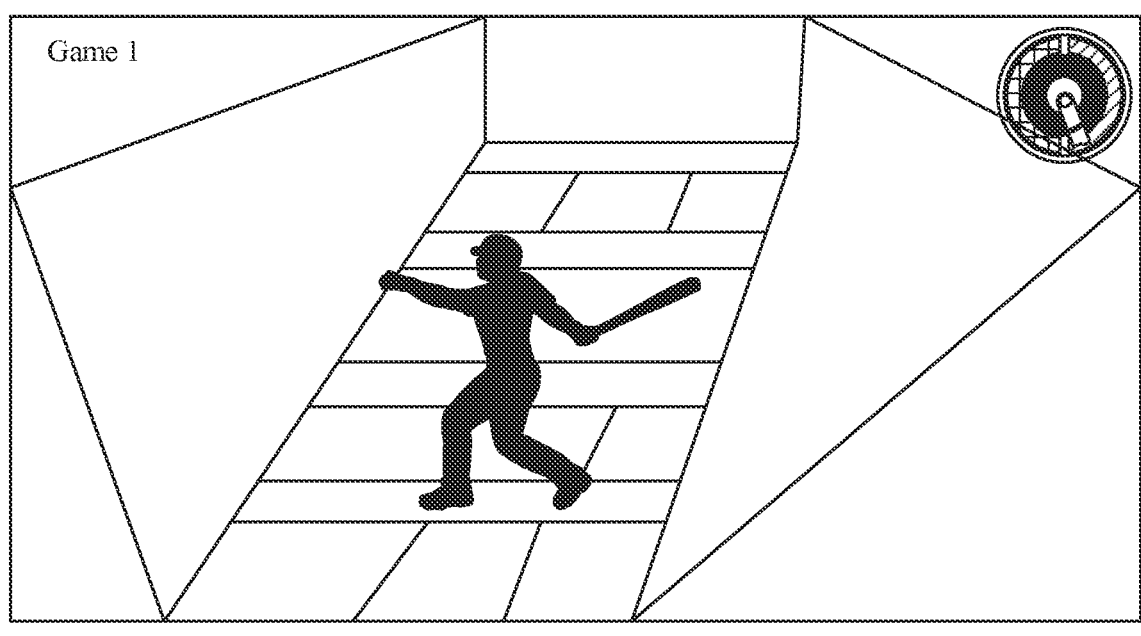
FIG. 18 is still another schematic diagram of a VR field of view according to an embodiment of this application.

In some other embodiments, when the user performs an operation (for example, a tap operation) on the first VR operation interface, the watch may alternatively detect the operation by the user on a function control on the first VR operation interface (for example, may detect the operation via a pressure sensor), determine a location relationship of a finger of the user relative to the first VR operation interface, and send the location relationship to the mobile phone. When performing synthesis and rendering on the interface of the first VR application and the first VR operation interface, the mobile phone may generate a virtual finger, and display the virtual finger in a synthesized image based on the location relationship of the finger of the user relative to the first VR operation interface. For example, as shown in FIG. 18, when the location relationship of the finger of the user relative to the first VR operation interface is that the finger stays on a function control, in the synthesized image, the virtual finger is correspondingly displayed above the function control.

Figure 19:
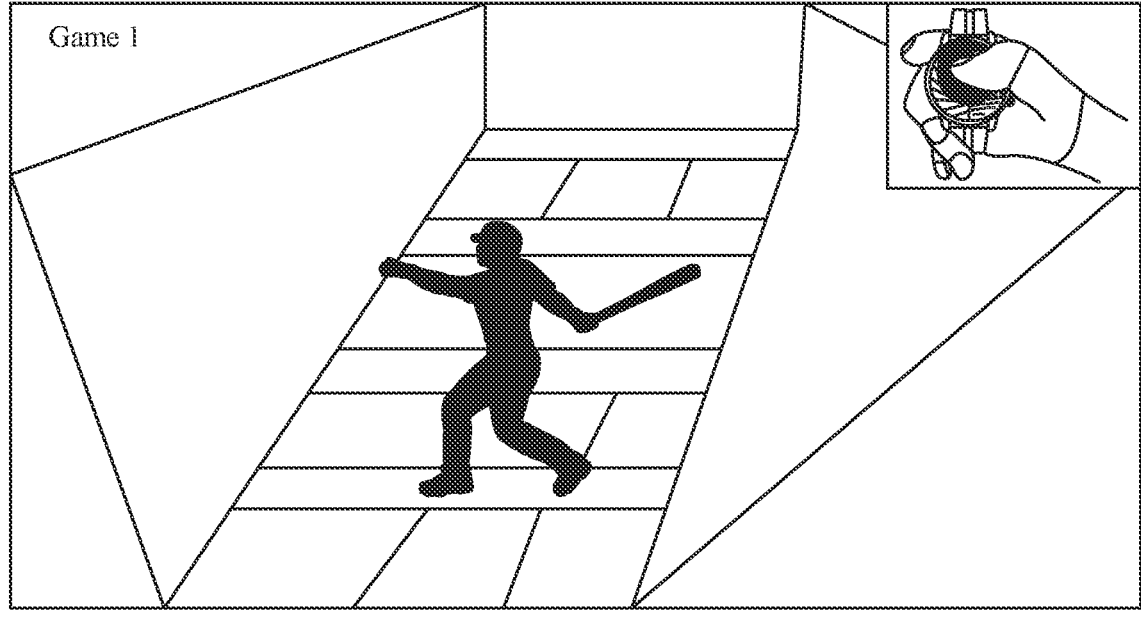
FIG. 19 is still another schematic diagram of a VR field of view according to an embodiment of this application.

In some other embodiments, a camera may be installed on the VR glasses. When the user holds the watch in hand to interact with the VR glasses, the camera may be configured to capture a video image in which the user holds the watch in hand (the first VR operation interface displayed by the watch may be seen in the video image), and send the video image to the mobile phone. The mobile phone performs synthesis and rendering on the interface of the first VR application and the video image (for example, in this case, the first VR operation interface is no longer used for synthesis), and displays a synthesized image in the VR field of view. For example, as shown in FIG. 19, when the user holds the watch in hand to interact with the VR glasses, the video image in which the user holds the watch in hand and that is captured by the camera is displayed in the synthesized image.

Optionally, the VR basic operation interface or the first VR operation interface (or a video image in which the watch displays the VR basic operation interface or the first VR operation interface) displayed in the VR field of view is obtained by zooming in or out the VR basic operation interface or the first VR operation interface (or the video image displayed when the watch displays the VR basic operation interface or the first VR operation interface) provided by the watch. For example, the VR basic operation interface or the first VR operation interface (or the video image in which the watch displays the VR basic operation interface or the first VR operation interface) in the watch face of the watch may be zoomed in or zoomed out in a first proportion and then displayed in the VR field of view. A size of the first proportion is not limited herein. For example, the first proportion may be 180%, 200%, or the like.

Optionally, in this embodiment of this application, a suspension location of the VR basic operation interface or the first VR operation interface (or the video image in which the watch displays the VR basic operation interface or the first VR operation interface) in the VR field of view is not limited. For example, the VR basic operation interface or the first VR operation interface (or the video image in which the watch displays the VR basic operation interface or the first VR operation interface) may also be displayed in the middle, on the left side, just below, or in a lower right corner of the VR field of view.

Optionally, an image in the VR field of view may change, but the VR basic operation interface or the first VR operation interface (or the video image in which the watch displays the VR basic operation interface or the first VR operation interface) is always suspended at a fixed position in the VR field of view.

In some embodiments, the mobile phone may determine a plurality of first VR operation interfaces, that is, may determine a plurality of first VR operation interfaces that match the configuration information of game 1. For example, both VR operation interfaces shown in (a) in FIG. 10 and (b) in FIG. 10 may be used as the first VR operation interfaces. When the mobile phone determines the plurality of first VR operation interfaces, the mobile phone may randomly select one of the first VR operation interfaces and configure the first VR operation interface for the watch, so that the user performs subsequent operations. Alternatively, the mobile phone may also perform selection according to another rule, for example, select a first VR operation interface with a minimum quantity of function controls. This is not limited herein. In a process of interacting with the VR glasses by using the watch, the user may further switch the first VR operation interface provided by the watch, for example, switch from (a) in FIG. 10 to (b) in FIG. 10.

Figure 20:
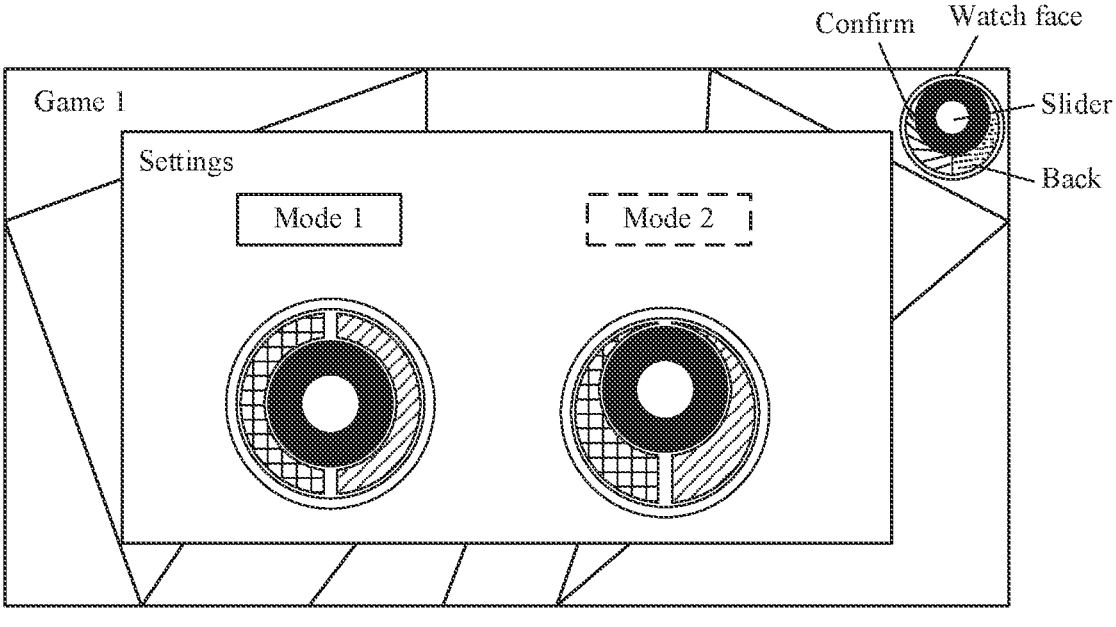
FIG. 20 is still another schematic diagram of a VR field of view according to an embodiment of this application.
Figure 21:
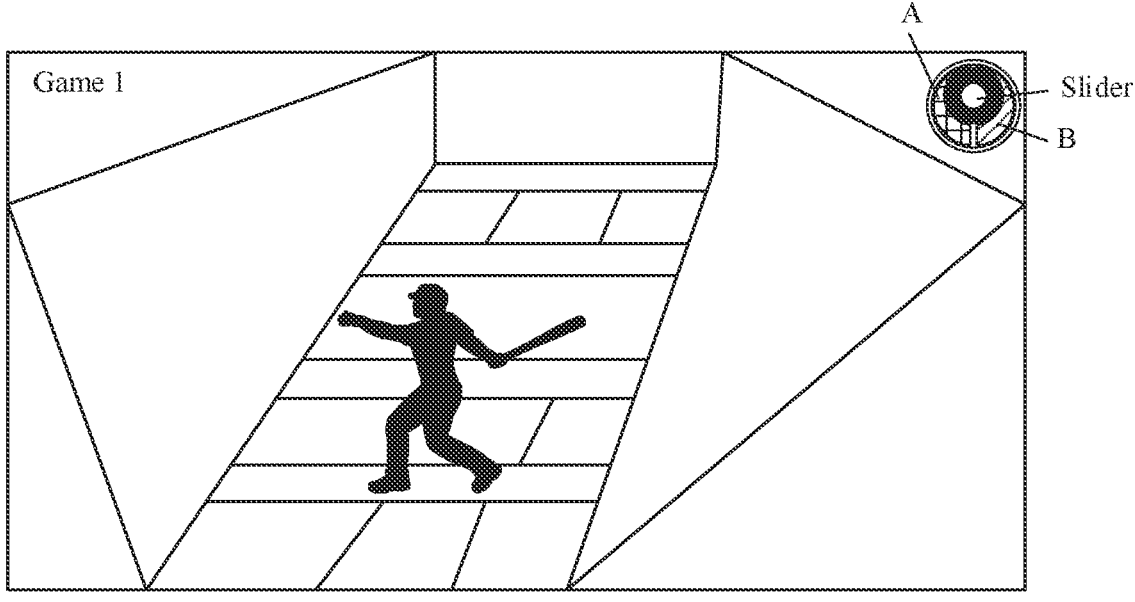
FIG. 21 is still another schematic diagram of a VR field of view according to an embodiment of this application.

For example, in a possible design, the configuration information of game 1 may further include control function 7 "settings". The mobile phone may generate a mapping relationship between "settings" and a watch crown of the watch, and configure the watch crown of the watch as a setting function of game 1 based on the mapping relationship. In a process of interacting with the VR glasses by using the watch, the user may perform an operation (for example, touch and hold, or tap) on the watch crown, so that the mobile phone invokes a setting interface of game 1 (a specific principle is similar to that of the foregoing other control functions). As shown in FIG. 20, when the mobile phone determines that both VR operation interfaces shown in (a) in FIG. 10 and (b) in FIG. 10 match game 1, the setting interface of game 1 may include mode 1 and mode 2, where mode 1 is the VR operation interface shown in (a) in FIG. 10, and mode 2 is the VR operation interface shown in (b) in FIG. 10. Still refer to FIG. 20. After the mobile phone invokes the setting interface of game 1, the display interface of the watch face of the watch is switched from the first VR operation interface (assuming that the first VR operation interface is shown in (a) in FIG. 10) to the VR basic operation interface. The user may use a function control on the VR basic operation interface to move a selection box (for example, a solid box around "Mode 1") to "Mode 1" or "Mode 2" on the setting interface of game 1, and tap "Confirm", so as to select a VR operation interface corresponding to mode 1 or mode 2 as the first VR operation interface provided by the watch. For example, if the user selects "Mode 2" and taps "Confirm", the first VR operation interface is switched from the VR operation interface shown in (a) in FIG. 10 to the VR operation interface shown in (b) in FIG. 10. As shown in FIG. 21, after completing the foregoing operations, the mobile phone closes the setting interface of game 1, and redisplays the complete interface of game 1. In addition, the display interface of the watch face of the watch displays the latest first VR operation interface (for example, as shown in (b) in FIG. 10) that is selected by the user.

It may be understood that, in the foregoing process, a scenario in the VR field of view changes correspondingly with interface switching of the mobile phone and the watch face of the watch. Therefore, FIG. 20 and FIG. 21 both use the VR field of view for illustration. Similarly, in the following other embodiments, some accompanying drawings are also illustrated by using the VR field of view.

In some embodiments, when interacting with the VR glasses by using a first VR operation interface provided by the watch face of the watch, the user may further actively configure a mapping relationship between a function control on the first VR operation interface and a control function of game 1, and an arrangement (or referred to as a layout) of an area in which the function control on the first VR operation interface is located.

For example, the watch may provide a configuration function (or referred to as a modification function) of the first VR operation interface for the user. The user may trigger the configuration function of the first VR operation interface by performing an operation such as a 3D touch (touch) operation, touching and holding, or double-tapping on the function control on the first VR operation interface provided by the watch. Alternatively, the watch may provide a function control specially used to trigger the configuration function of the first VR operation interface. The user may perform an operation on the function control to trigger the configuration function of the first VR operation interface. This is not limited. When the configuration function of the first VR operation interface is triggered, the watch switches the first VR operation interface to a configurable first VR operation interface. The user may configure, in the configurable first VR operation interface, the mapping relationship between the function control and the control function of game 1, the layout of the area in which the function control is located, and the like. In addition, in the foregoing process, when performing rendering and synthesis on the configurable first VR operation interface and the interface of game 1, the mobile phone may further zoom in the configurable first VR operation interface in the VR field of view for display, for example, display the configurable first VR operation interface in the middle of the VR field of view. Zooming in for display herein means that zooming in is performed on the configurable first VR operation interface for display compared with a first VR operation interface displayed when the configuration function is not triggered. A zooming-in proportion may be 300%, 350%, 500%, or the like. This is not limited. The following separately provides descriptions by using examples.

First, a process in which the user configures the mapping relationship between the function control on the first VR operation interface and the control function of game 1 is described by using an example.

Figure 17:
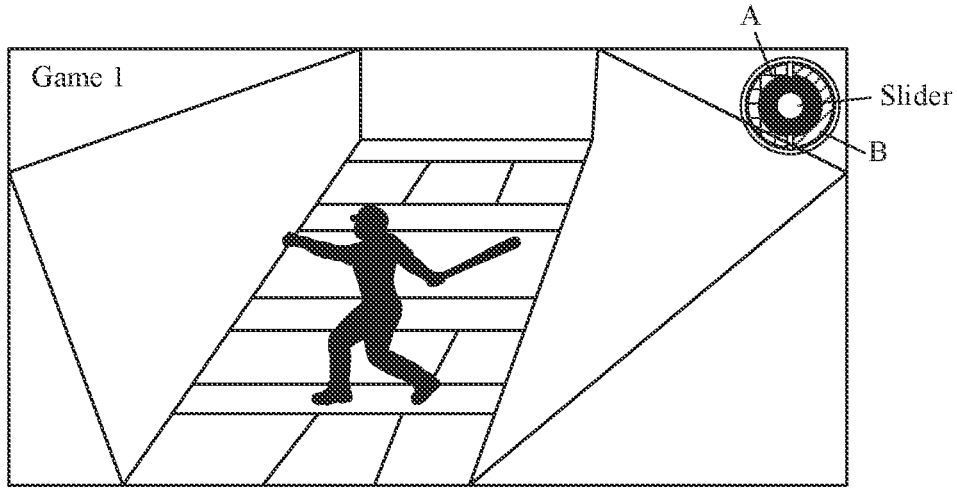
FIG. 17 is still another schematic diagram of a VR field of view according to an embodiment of this application.
Figure 22:
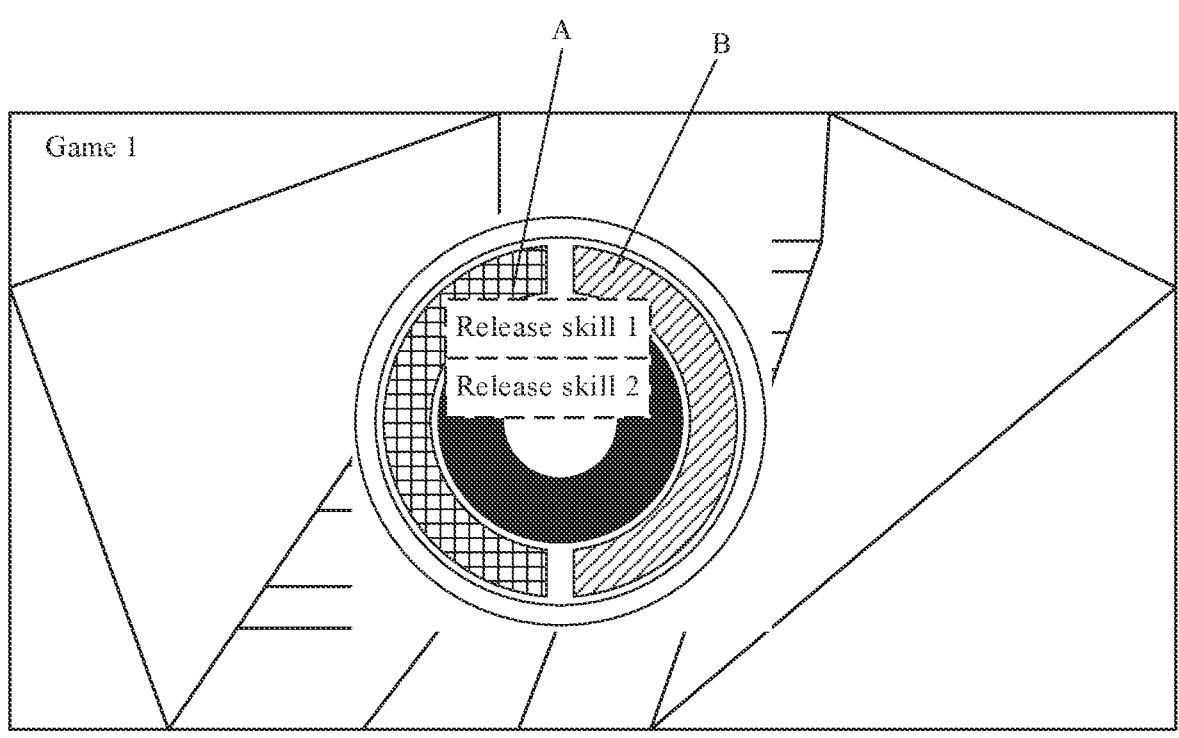
FIG. 22 is still another schematic diagram of a VR field of view according to an embodiment of this application.

It is assumed that the first VR operation interface provided by the watch face of the watch is shown in FIG. 17. With reference to Table 2, it can be learned that a control function corresponding to the function control A of the first VR operation interface is "release skill 1", and a control function corresponding to the function control B is "release skill 2". If the user needs to change the control function corresponding to the function control A to "release skill 2", the user may touch and hold or double-tap (not limited) the function control A on the watch face of the watch. The watch may switch the first VR operation interface to the configurable first VR operation interface in response to the foregoing touching and holding or double-tap operation by the user on the function control A. As shown in FIG. 22, in the configurable first VR operation interface, two function controls of "release skill 1" and "release skill 2" are displayed on one side of the function control A. In this case, the displayed "release skill 1" and "release skill 2" may be referred to as alternative control functions, and the user may select "release skill 2" as a target control function (a selection manner is not limited to touch tap or voice). In response to the selection operation performed by the user on "release skill 2", the watch may configure "release skill 2" as the control function corresponding to the function control A. Similarly, the user may further modify the control function corresponding to the function control B to "release skill 1", or the watch may automatically modify the control function corresponding to the function control B to "release skill 1". Details are not described again. That the watch modifies a control function corresponding to a function control to the target control function in response to a selection operation performed by the user on the target control function specifically means: The watch may update a mapping relationship between a function control of a first VR operation interface in the mobile phone and the watch and a control function of game 1 in response to the selection operation performed by the user on the target control function. For example, the watch may send an update instruction (which may be referred to as a first update instruction, and an operation performed by the user to modify the mapping relationship may be referred to as a first update operation) to the mobile phone, to instruct the mobile phone to modify the mapping relationship as that "release skill 2" corresponds to the function control A and "release skill 1" corresponds to the function control B.

Then, a process in which the user configures the layout of the area in which the function control on the first VR operation interface is located is described by using an example. The operation of modifying the layout of the function control by the user may be referred to as a second update operation, and an instruction sent by the watch to the mobile phone in response to the second update operation may be referred to as a second update instruction.

Figure 23:
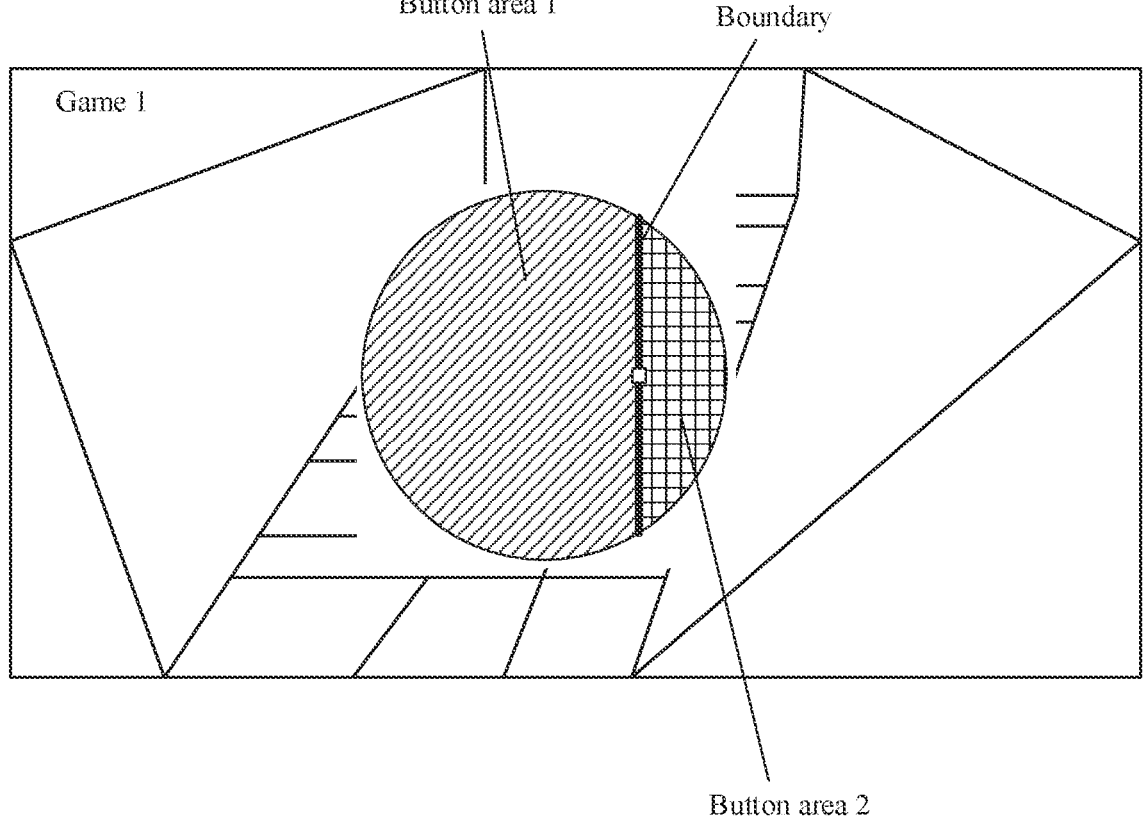
FIG. 23 is still another schematic diagram of a VR field of view according to an embodiment of this application.

For example, the VR operation interface shown in (b) in FIG. 7 is the first VR operation interface. The first VR operation interface includes two function controls, and there is a boundary (not shown in (b) in FIG. 7) between areas (button area 1 and button area 2) in which the two function controls are located. The user may touch and hold an area in which the boundary is located on the first VR operation interface, and the watch may switch the first VR operation interface to the configurable first VR operation interface in response to a touch and hold operation by the user on the boundary. The user may drag the boundary on the configurable first VR operation interface, and the watch may change, in response to a dragging operation by the user on the boundary, a size of an area in which each function control is located. In this way, the user can customize a size of an area in which each function control is located. For example, refer to FIG. 23. When the user drags the boundary in the configurable first VR operation interface to the right, an area (button area 1) in which a function control on the left is located becomes larger, and an area (button area 2) in which a function control on the right is located becomes smaller. Similarly, if the user drags the boundary to the left, the area in which the function control on the left is located becomes smaller, and the area in which the function control on the right is located becomes larger. It may be understood that, in a scenario in which the first VR operation interface includes three function controls, four function controls, or more function controls, sizes of areas in which different function controls are located may be changed by dragging boundaries between the areas in which the function controls are located. Details are not described herein again.

Figure 24:
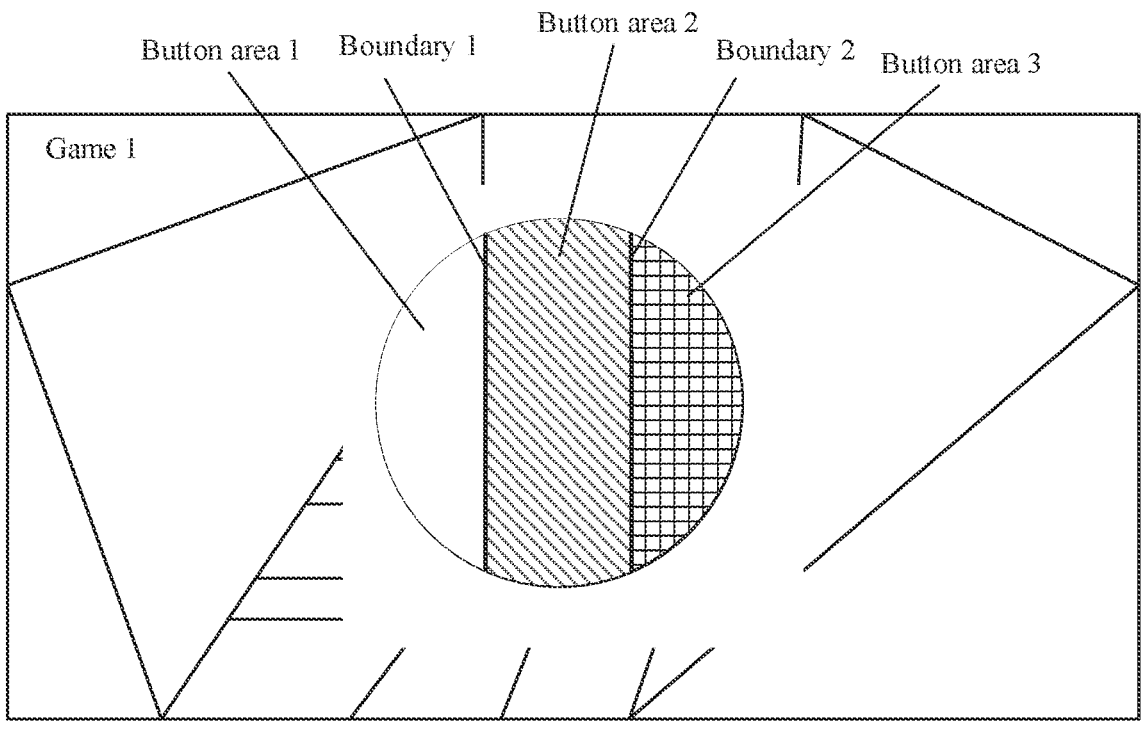
FIG. 24 is still another schematic diagram of a VR field of view according to an embodiment of this application.

Alternatively, for example, the VR operation interface shown in (c) in FIG. 7 is the first VR operation interface. The first VR operation interface includes three function controls, and there are (two) boundaries between areas (button area 1, button area 2, and button area 3) in which the function controls are located. The user may drag the two boundaries on a configurable first VR operation interface provided by the watch, and the watch may change, in response to a dragging operation by the user on the boundaries, a location of the area in which each function control is located. For example, refer to FIG. 24. When the user drags two ends of each of the two boundaries (boundary line 1 and boundary line 2) in the configurable first VR operation interface by using the center of the watch face as a reference, so that the two boundaries are rotated clockwise by 90 degrees by using the center of the watch face as a center. Locations of the areas in which the three function controls are located are originally horizontally arranged as shown in (c) in FIG. 7, and now change to be vertically arranged as shown in FIG. 24.

Alternatively, the user may change a size and a location of an area in which the function control on the first VR operation interface is located at the same time. A principle is the same, and details are not described again.

The foregoing example in which the user configures the layout of the area in which the function control on the first VR operation interface is located is described by using an example in which the first VR operation interface includes a function control similar to a button. However, it should be understood that, similar to this, in another example, the user may also configure a layout of an area in which a function control similar to a joystick on the first VR operation interface is located.

Figure 25:
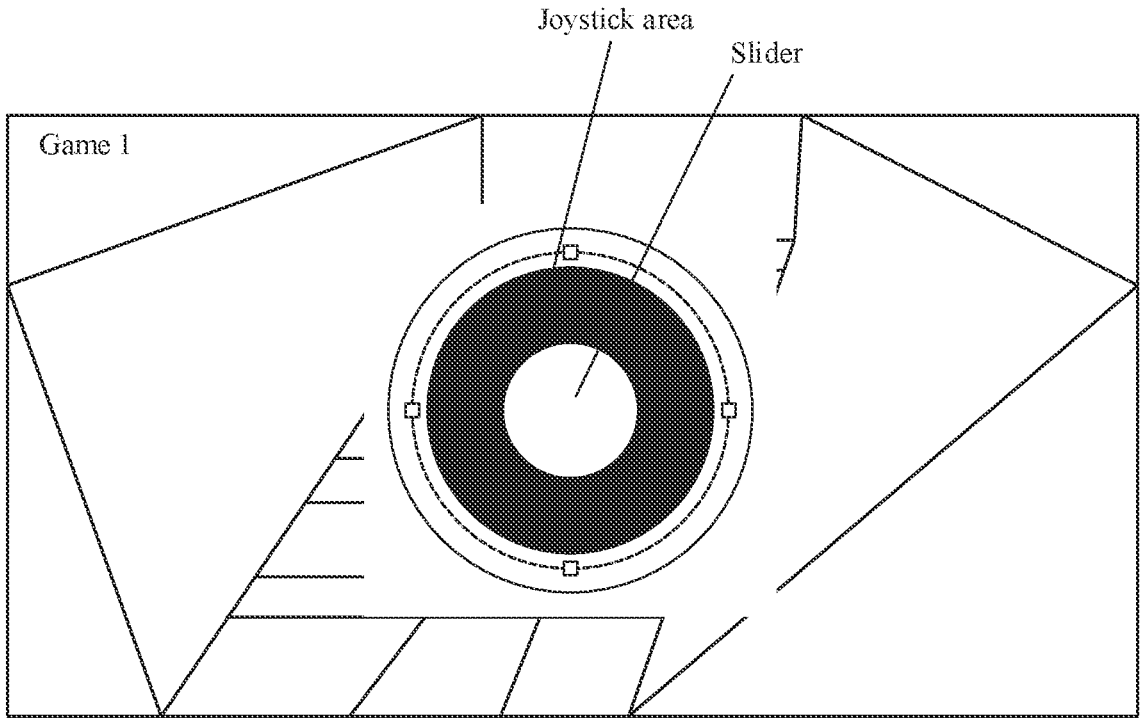
FIG. 25 is still another schematic diagram of a VR field of view according to an embodiment of this application.
Figure 26:
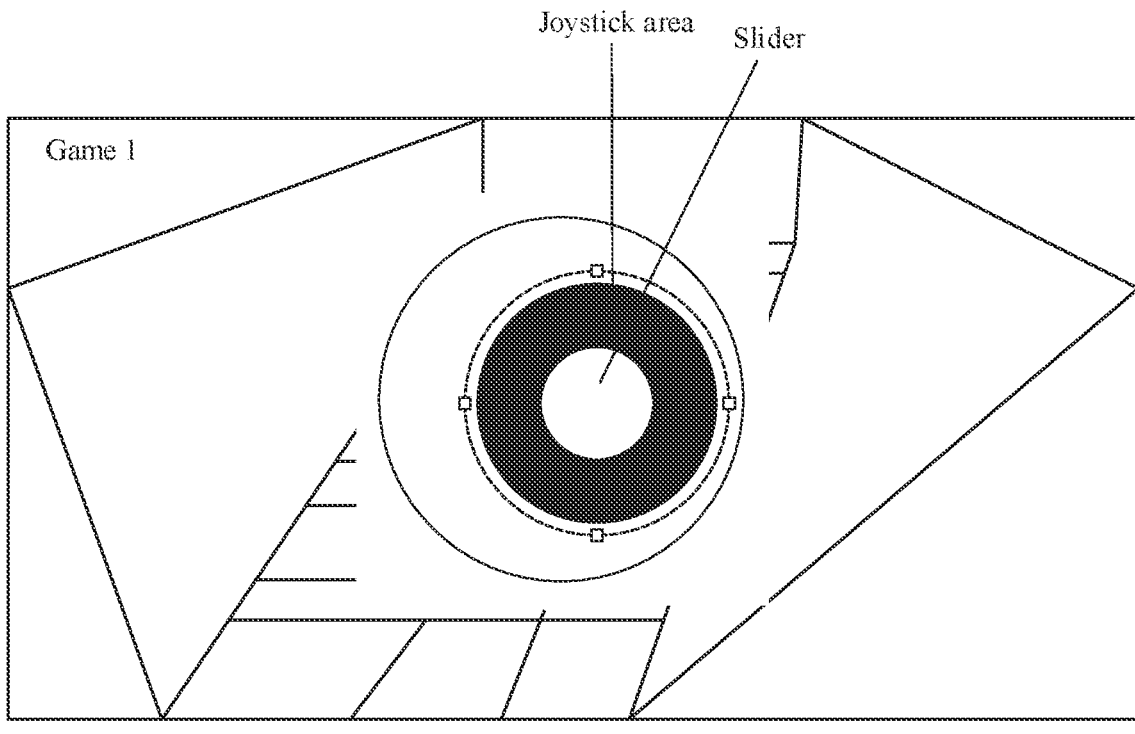
FIG. 26 is still another schematic diagram of a VR field of view according to an embodiment of this application.

For example, the user can further adjust a size and a location of a joystick area in any one of the VR operation interfaces shown in FIG. 8 to FIG. 11. For example, the VR operation interface shown in FIG. 8 is the first VR operation interface. The first VR operation interface includes a joystick area and a slider. The user may perform a 3D touch operation on the joystick area on the first VR operation interface provided by the watch. The watch may switch the first VR operation interface to a configurable first VR operation interface in response to the 3D touch operation performed by the user on the joystick area. For the configurable first VR operation interface, refer to FIG. 25. The user may perform an operation of zooming out and an operation of moving right on the joystick area on the configurable first VR operation interface. For example, the user may use two fingers to press the joystick area and slide toward a center direction of a dashed circle to implement zooming out, or use a finger to press the joystick area and drag the joystick area to the right to implement moving right. In response to the operation of zooming out and the operation of moving right that are performed by the user on the joystick area, the watch may adjust a size and a location of the joystick area shown in FIG. 25 to those shown in FIG. 26. In a process of moving the joystick area, the slider moves along with the joystick area.

Optionally, in a possible design, an operation of zooming in or out performed by the user on the joystick area on the configurable first VR operation interface may be further completed via a watch crown of the watch. For example, when the watch is switched to the configurable first VR operation interface, the user may rotate the watch crown clockwise, and the watch may zoom in the joystick area in response to an operation of rotating the watch crown clockwise by the user. Alternatively, the user may rotate the watch crown anticlockwise, and the watch may zoom out the joystick area m response to the operation of rotating the watch crown anticlockwise by the user.

In this embodiment of this application, when interacting with the VR glasses by using a first VR operation interface provided by the watch face of the watch, the user actively configures the mapping relationship between a function control on the first VR operation interface and a control function of game 1, and the arrangement (or referred to as the layout) of the area in which the function control on the first VR operation interface is located, so that the first VR operation interface can better comply with a use habit of the user. For example, the VR operation interface shown in (b) in FIG. 7 is the first VR operation interface. If the user holds the watch with the right hand to interact with the VR glasses, the user may need to use a thumb to perform an operation on a function control on the first VR operation interface provided by the watch, and the thumb of the user is relatively far away from left-side button area 1. In this case, the user may drag the boundary on the first VR operation interface to the right in the manner described in the foregoing embodiment, so that button area 1 becomes larger, and button area 2 becomes smaller. Therefore, the user can operate a function control on button area 1 more easily by using the thumb, and has better experience.

Optionally, in embodiments of this application, when the mobile phone renders and synthesizes the configurable first VR operation interface and the interface of game 1, and zooms in the configurable first VR operation interface in the VR field of view for display, in the VR field of view, the interface of game 1 is temporarily used as a background interface of the first VR operation interface. During rendering, the mobile phone may further perform background weakening processing on an image of game 1. For example, the image of game 1 may be faded.

Figure 27:
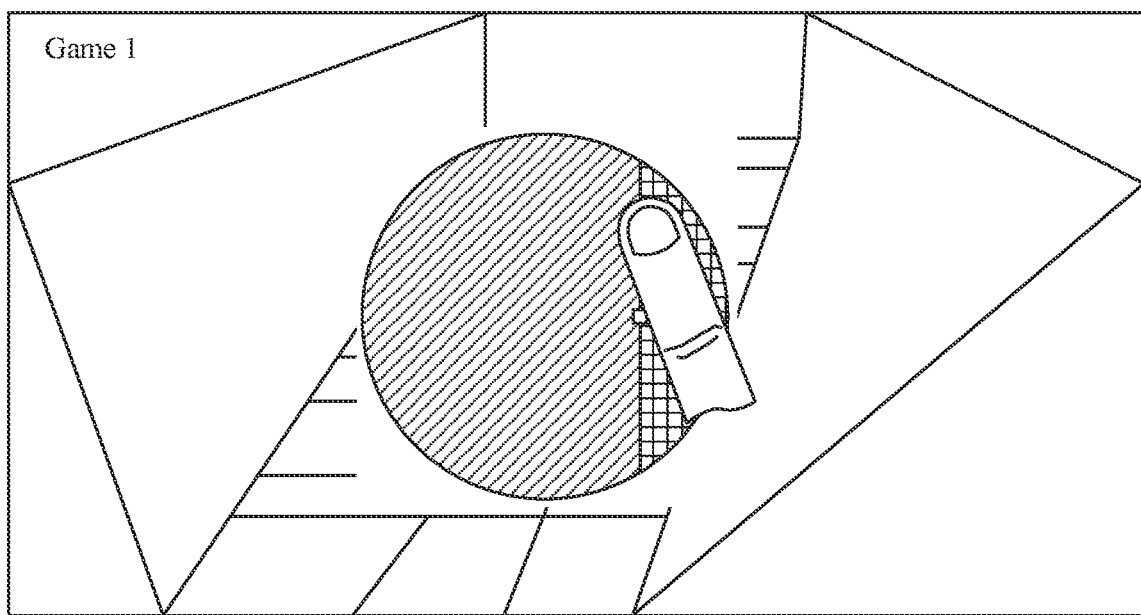
FIG. 27 is still another schematic diagram of a VR field of view according to an embodiment of this application.

Similar to the foregoing embodiment in which when the watch user operates the function control on the first VR operation interface, the synthesized image displayed in the VR field of view includes the interface of the first VR application, the first VR operation interface, and the virtual finger, in some embodiments, when the user configures the layout of the area in which the function control on the first VR operation interface is located, for a synthesized image of the configurable first VR operation interface and the first VR operation interface, refer to FIG. 27, and a virtual finger can also be displayed. A specific principle is similar to that in the foregoing embodiment, and details are not described again.

Figure 28:
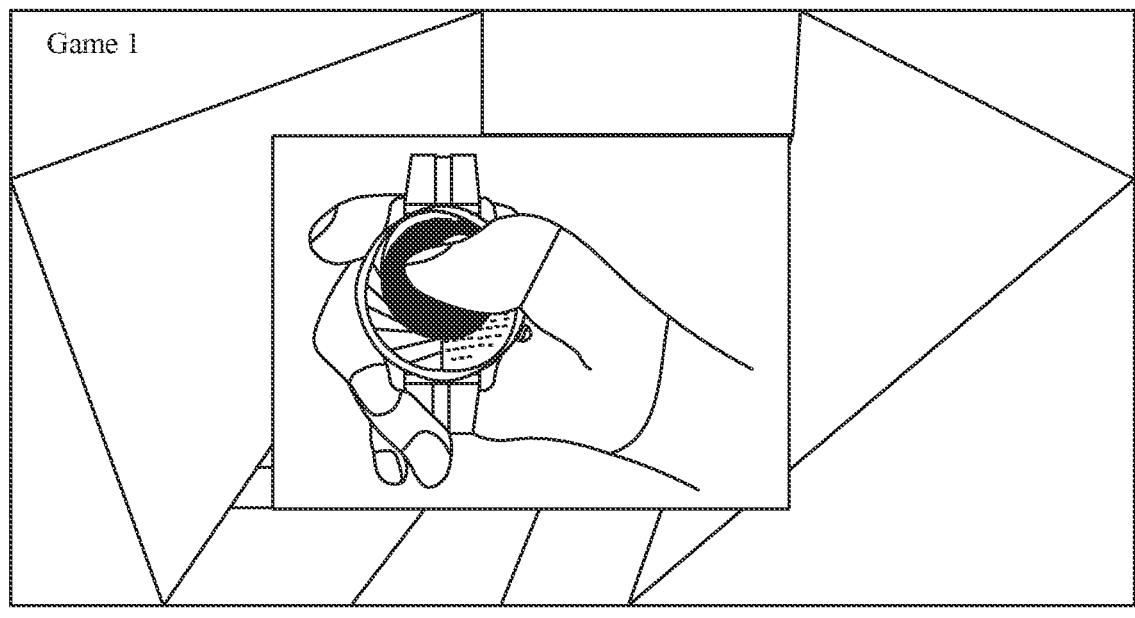
FIG. 28 is still another schematic diagram of a VR field of view according to an embodiment of this application.

Similar to the foregoing embodiment in which when the watch user operates the function control on the first VR operation interface, the synthesized image displayed in the VR field of view includes the interface of the first VR application and the video image in which the user holds the watch in hand, in some other embodiments, when the user configures the layout of the area in which the function control on the first VR operation interface is located, refer to FIG. 28, a synthesized image displayed in the VR field of view may also include an interface of a first VR application and a video image in which the user holds the watch in hand, and the configurable first VR operation interface displayed on the watch face of the watch may be seen in the video image. A specific principle is similar to that in the foregoing embodiment, and details are not described again.

In the foregoing embodiments in which the user actively configures the mapping relationship between the function control on the first VR operation interface and the control function of game 1 and the layout of the area in which the function control on the first VR operation interface is located, an example in which the user performs an operation on a watch side is used for description. In some other embodiments, the user may alternatively actively configure, on a mobile phone side, the mapping relationship between the function control on the first VR operation interface and the control function of game 1, and the layout of the area in which the function control on the first VR operation interface is located.

For example, when displaying the interface of game 1, the mobile phone may further obtain the first VR operation interface provided by the watch for display through screen splitting. Function controls included in the first VR operation interface are the same as those on the watch side. In this case, the user may complete, on the first VR operation interface provided by the mobile phone, the related configuration described in the foregoing embodiments. A specific principle of the configuration is the same as that of the configuration on the watch side, and details are not described again. A difference lies in that when the user configures, on the mobile phone, the mapping relationship between the function control on the first VR operation interface and the control function of game 1 and the layout of the area in which the function control on the first VR operation interface is located, the mobile phone needs to synchronously update a modified mapping relationship between a function control on the first VR operation interface and a control function of game 1 and a modified layout of the area in which the function control on the first VR operation interface is located to the watch, so that the watch can subsequently provide the corresponding first VR operation interface based on the configuration of the user.

Optionally, in some embodiments, the user may further configure a preset VR operation interface stored in the mobile phone. For example, the mobile phone may provide a configuration interface used by the user to configure the preset VR operation interface. The user may configure the preset VR operation interface on the configuration interface on the mobile phone.

Figure 29:
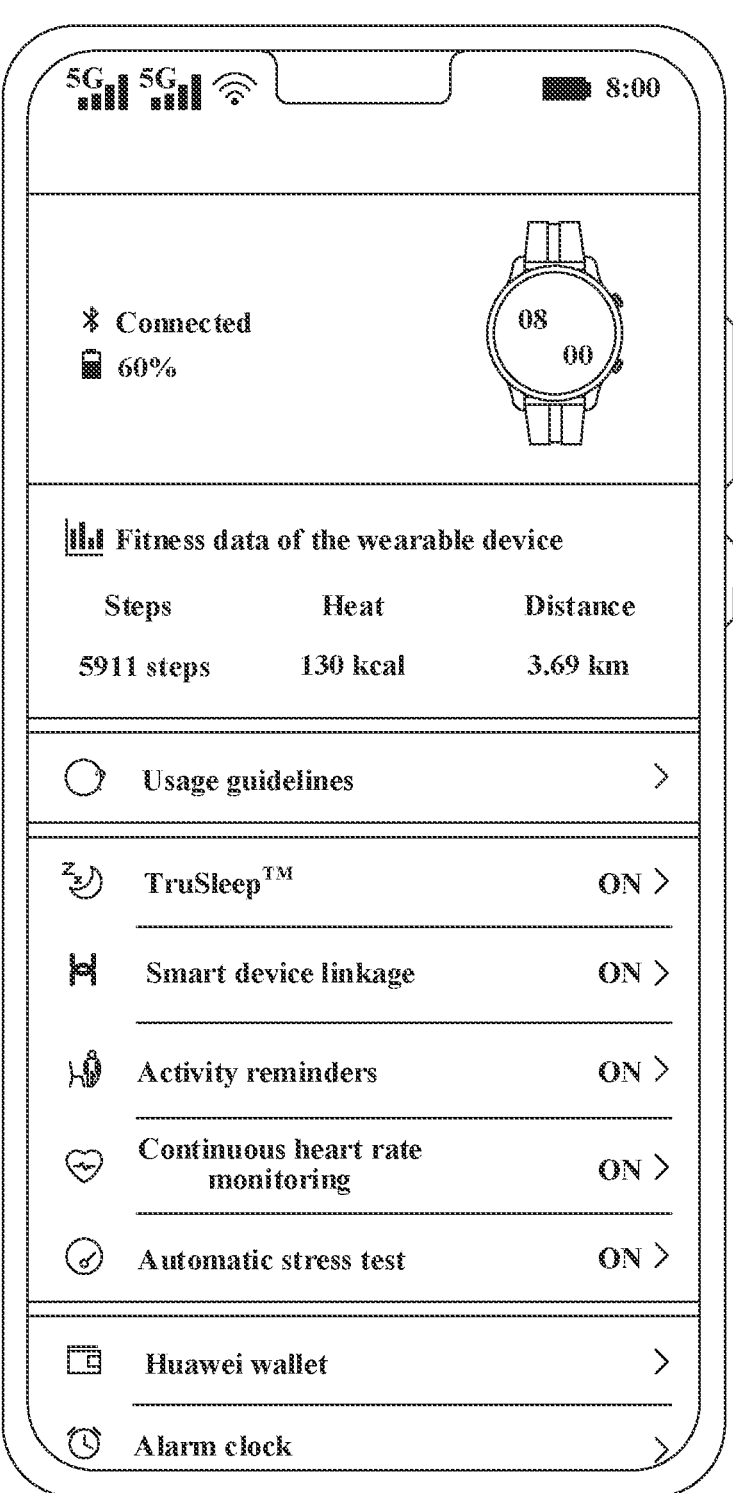
FIG. 29 is a schematic diagram of an interface of an AI Life/Health application according to an embodiment of this application.

An example is used for description. FIG. 29 is a schematic diagram of an interface of an AI Life/Health application (application, APP) according to an embodiment of this application. As shown in FIG. 29, a mobile phone may be installed with the AI Life/Health application. On an interface of the AI Life/Health application, "Connected" indicates a connection status between the mobile phone and a watch. "Fitness data of a wearable device" is some fitness data collected by the watch, for example, step counts, calories, and a distance. In addition, the interface of the AI Life/Health application may also include some other options such as "TruSleep™", "Activity reminder", "Heart rate measurement", and "Smart device linkage", to help the user select a corresponding function. Optionally, an operation of selecting the foregoing options by the user may be a voice operation, a touch operation, or the like. This is not limited herein.

Figure 30:
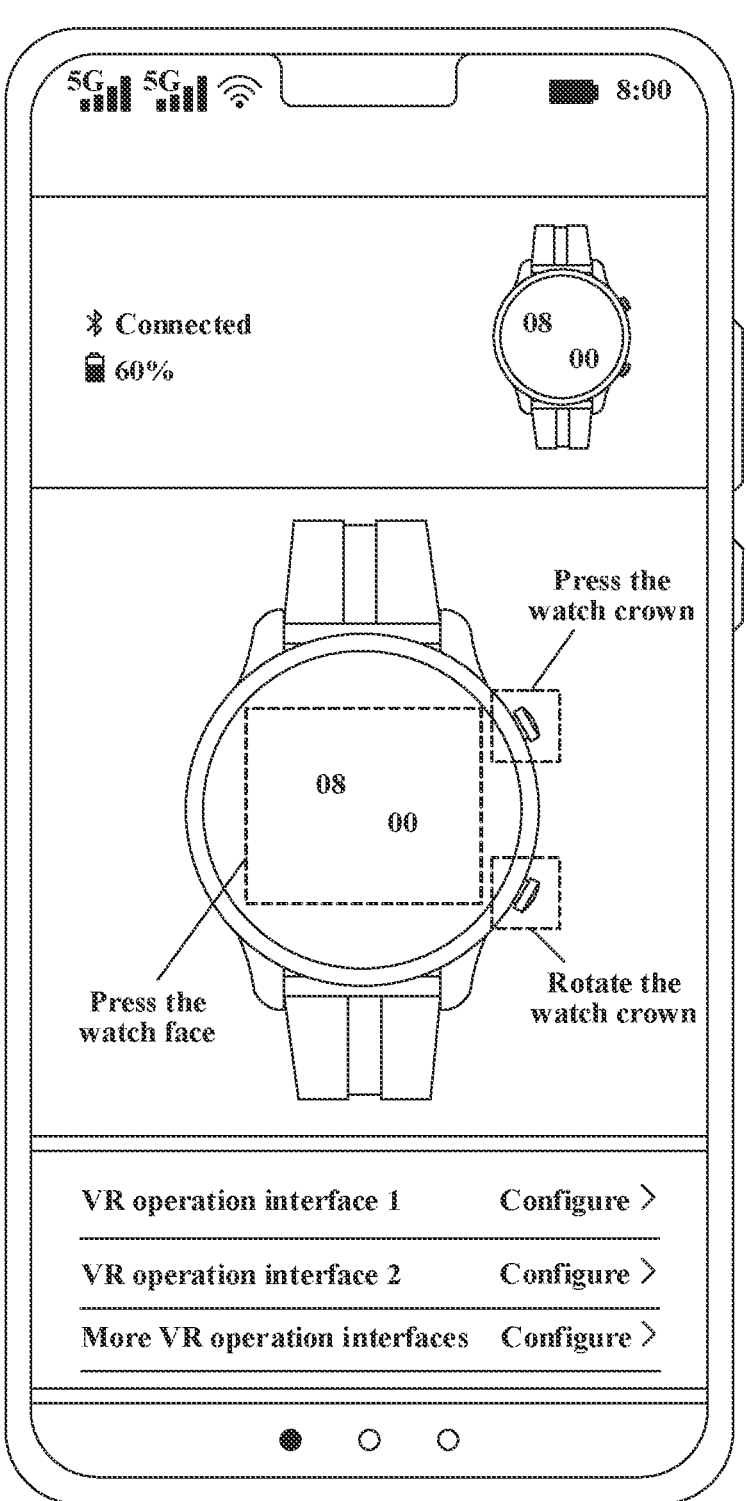
FIG. 30 is a schematic diagram of another interface of an AI Life/Health application according to an embodiment of this application.
Figure 31:
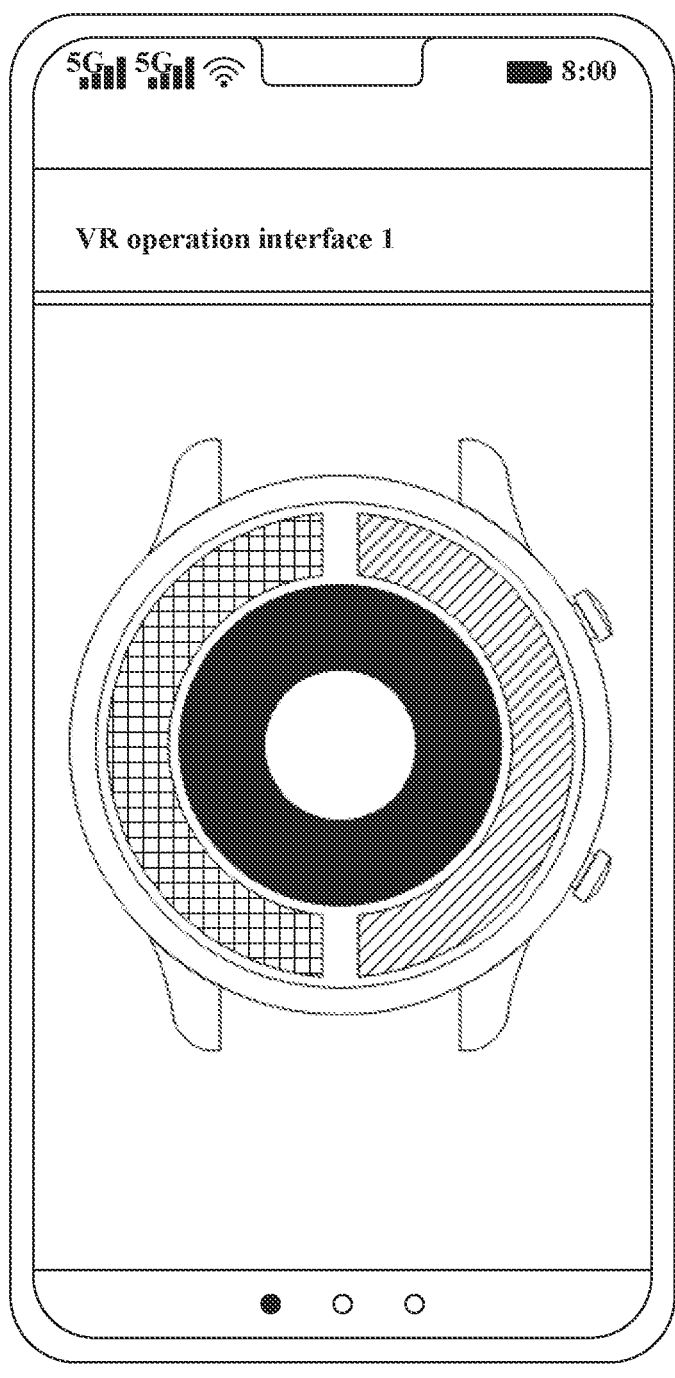
FIG. 31 is a schematic diagram of still another interface of an AI Life/Health application according to an embodiment of this application.

For the "Smart device linkage" option on the interface of the AI Life/Health application, after the user selects the option, the mobile phone displays selection options used for a plurality of VR operation interfaces. As shown in FIG. 30, the mobile phone may display, in response to the selection operation performed by the user on the "Smart device linkage" option, options of the plurality of VR operation interfaces such as VR operation interface 1, VR operation interface 2, and more VR operation interfaces. If the user needs to select VR operation interface 1 for configuration, the user may tap a "Configure" function control after the option of VR operation interface 1. The mobile phone may switch, in response to a tapping operation by the user on the "Configure" function control after the option of VR operation interface 1, to a display interface including VR operation interface 1. The display interface including VR operation interface 1 may be shown in FIG. 31. On the mobile phone display interface shown in FIG. 31, the user may configure VR operation interface 1, for example, may configure an arrangement (or referred to as a layout) of an area in which a function control in VR operation interface 1 is located. A specific configuration process is similar to the foregoing configuration of the first VR operation interface, and details are not described again.

Optionally, in some embodiments, the mobile phone may select, via the watch crown of the watch from the plurality of preset VR operation interfaces based on the configuration information of game 1, the first VR operation interface that matches the configuration information of game 1. The mapping relationship that is between the control function of game 1 and the function control included in the first VR operation interface and that is established by the mobile phone further includes a mapping relationship between the control function of game 1 and the watch crown. Therefore, the user may also implement the corresponding control function in game 1 by operating the watch crown. For example, the watch crown may be used to control a moving speed of a virtual object in game 1. When the watch crown rotates clockwise, the moving speed of the virtual object may be increased; otherwise, the moving speed of the virtual object may be decreased. A specific principle of implementing the corresponding control function in game 1 by operating the watch crown is similar to that of another function control on the first VR operation interface, and details are not described herein again.

Optionally, in embodiments of this application, when there are two watches connected to the mobile phone, the mobile phone may split the first VR operation interface into two corresponding sub-interfaces, and respectively configure the two sub-interfaces for the two watches. For example, a sub-interface configured for the first watch includes a joystick area and a slider, and a sub-interface configured for the second watch includes function controls A and B. The user can hold one watch in the left hand and one watch in the right hand, and use the two watches at the same time to interact with the VR glasses.

In some embodiments, there may be a plurality of VR glasses and watches in the application scenarios shown in FIG. 1 and FIG. 2, for example, two, three, or more. The mobile phone may separately configure each watch in the manner described in the foregoing embodiment. After the configuration is completed, the user may use a plurality of watches to interact with the VR glasses at the same time. For example, in a possible scenario, the mobile phone may run a VR game that can be played by two (not limited to two in another scenario) users at the same time. In this case, the mobile phone may be separately connected to two VR glasses and two watches, and the two users may separately wear one pair of VR glasses and use one watch, so as to experience the VR game in the mobile phone together.

In a possible design, the first VR operation interface configured for the watch mentioned in the foregoing embodiments may be migrated. For example, the first VR operation interface may be migrated from watch 1 to watch 2. This design may be applied to a scenario in which there are a plurality of VR glasses and watches mentioned above, or may be applied to a scenario generated when a mobile phone is connected to only one watch and the watch is replaced.

The following describes an example of a manner in which the first VR operation interface is migrated from watch 1 to watch 2. It is assumed that in the manner described in the foregoing embodiments, when the mobile phone is connected to watch 1, the user completes configuration of the first VR operation interface on watch 1. In some implementations, when watch 2 is connected to the mobile phone, the mobile phone may directly configure the stored first VR operation interface for watch 2, so that watch 2 also has a same function of being reused as a VR peripheral as watch 1. Alternatively, in some other implementations, watch 1 and watch 2 may be wirelessly connected (for a specific connection manner, refer to the wireless connection in the foregoing embodiments). Watch 1 may send the first VR operation interface to watch 2, so that watch 2 may also have a same function of being reused as a VR peripheral as watch 1.

Optionally, in some embodiments, the mobile phone may further establish a mapping relationship between a control function of game 1 and the watch crown and/or an inertia measurement unit (inertial measurement unit, IMU) based on the configuration information of game 1 and the watch crown and/or the IMU of the watch. For example, a gesture may be set in the IMU to implement a function similar to that of a function control. The user may make a corresponding gesture by holding the watch in hand, so that the mobile phone controls game 1 to execute a corresponding control function. A principle thereof is similar to that of another function control, and details are not described again. In other words, in this embodiment of this application, when the watch is reused as the VR peripheral, the function control that can be used by the watch in the VR mode is not limited to the function control on the first VR operation interface, and may further include the watch crown, the IMU, and the like.

Optionally, in this embodiment of this application, when the watch is reused as the VR peripheral, a feedback may be further sent to the user based on an instruction of the mobile phone, and/or a feedback may be sent to the user based on an operation performed by the user on the watch.

For example, the mobile phone may send a vibration instruction to the watch based on a special effect in game 1. After receiving the vibration instruction, the watch may vibrate for 2 seconds or 3 seconds, to send a feedback to the user, so that the user can have better interaction experience. For another example, when the user performs an operation on the function control on the first VR operation interface provided by the watch, if the user taps the function control once, the watch may slightly vibrate, to prompt the user that the tapping is effective. Certainly, in embodiments of this application, a manner in which the mobile phone sends a feedback to the user may further include more forms such as a sound prompt and light. This is not limited herein.

Optionally, in some other embodiments, a distance sensor or an infrared sensor may be further disposed on the watch. When the user holds the watch in hand, the watch may determine, based on detection information of the distance sensor or the infrared sensor, whether the user currently holds the watch in the right hand or holds the watch in the left hand. For example, the VR operation interface shown in (b) in FIG. 7 is the first VR operation interface. If the watch determines that the user currently holds the watch in the right hand, the mobile phone may also automatically adjust button area 1 and button area 2, so that locations of button area 1 and button area 2 are adjusted, to better meet a finger tapping or touch requirement of the user. For example, the watch may automatically drag a boundary on the first VR operation interface to the right, so that button area 1 becomes larger, and button area 2 becomes smaller. Similarly, if the watch determines that the user currently holds the watch in the left hand, the watch may automatically drag the boundary on the first VR operation interface to the left, so that button area 1 becomes smaller, and button area 2 becomes larger.

Alternatively, the watch may further send a result of left/right hand detection to the mobile phone. When determining the first VR operation interface that matches the configuration information of game 1, the mobile phone may also consider the result of left/right hand detection, and select a VR operation interface that better meets a user operation requirement as the first VR operation interface.

In some embodiments, when the watch is in the VR mode, the watch may further collect health data, fitness data, and the like of the user. The watch may send the collected health data, fitness data, and the like of the user to the mobile phone. When performing rendering and synthesis on the display interface of the watch face of the watch and an interface of the VR software (for example, the interface of game 1 or the interface of the first VR application), the mobile phone may also add the received health data, fitness data, and the like of the user to a synthesized image for display in the field of view of the VR glasses, so that the user can view the health data and the fitness data of the user in a timely manner in a process of using the VR glasses.

Figure 32:
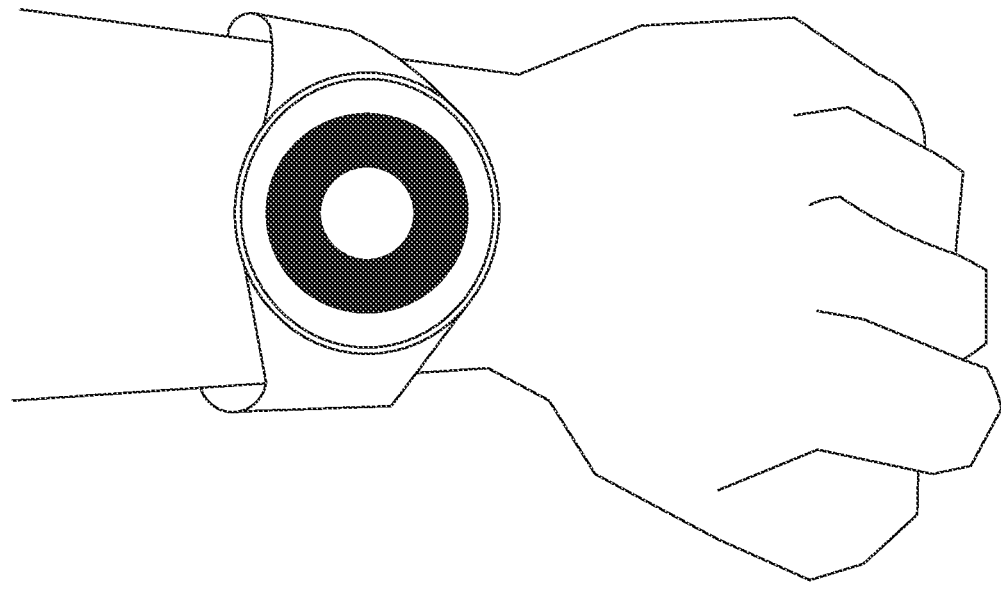
FIG. 32 is a schematic diagram of a scenario in which a user wears a watch according to an embodiment of this application.
Figure 33:
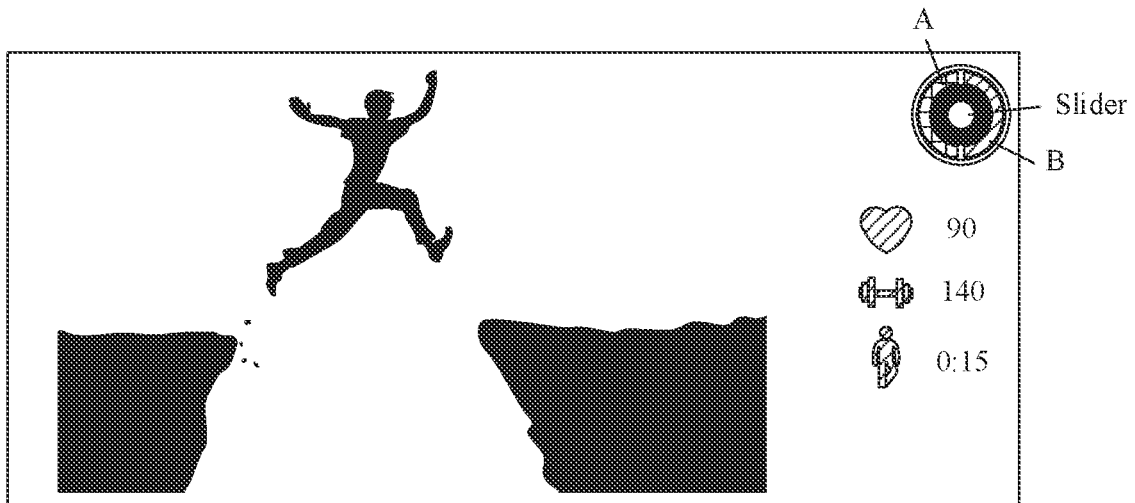
FIG. 33 is still another schematic diagram of a VR field of view according to an embodiment of this application.

For example, FIG. 32 is a schematic diagram of a scenario in which a user wears a watch according to an embodiment of this application. As shown in FIG. 32, the user may wear the watch on the hand. In this case, in addition to being reused as a handle of the VR glasses, the watch can further collect the health data of the user, for example, collect heartbeat data of the user; may collect the fitness data of the user, for example, collect a motion track and standing time of the user; or may further calculate, based on the collected fitness data, calories burned by the user in the VR mode. Then, the watch may send the collected health data, fitness data, and the like to the mobile phone. When performing rendering and synthesis on the display interface of the watch face of the watch and the interface of the VR software, the mobile phone may add the received health data, fitness data, and the like of the user to the synthesized image for display in the field of view of the VR glasses. FIG. 33 is still another schematic diagram of a VR field of view according to an embodiment of this application. As shown in FIG. 33, the health data of the user displayed in the VR field of view of the VR glasses is: 90 beats per minute for a heartbeat of the user, and the fitness data is: 120 calories burned and 15 minutes of walking.

In some embodiments, optionally, the watch can continuously monitor the heartbeat of the user in a process in which the user uses the VR glasses. When the user is in a normal heartbeat range (for example, 60 to 100 beats per minute), the watch displays a normal VR mode interface. When the heartbeat of the user exceeds a maximum bearing range (for example, greater than 100 beats per minute), the watch optionally gives an alarm to the surrounding user. For example, the watch face of the watch turns red, or the watch continuously vibrates at high frequency, or the watch generates an alarm sound; or the watch sends a command of "stopping running the VR software" to the mobile phone, and the mobile phone stops running the VR software after receiving the command. It may be understood that the alarm action, the sending command, and the like of the watch listed herein are merely examples for description. This application is not limited thereto, and is not specifically limited to one of or a combination of more of the alarm action, the sending command, and the like.

Figure 34:
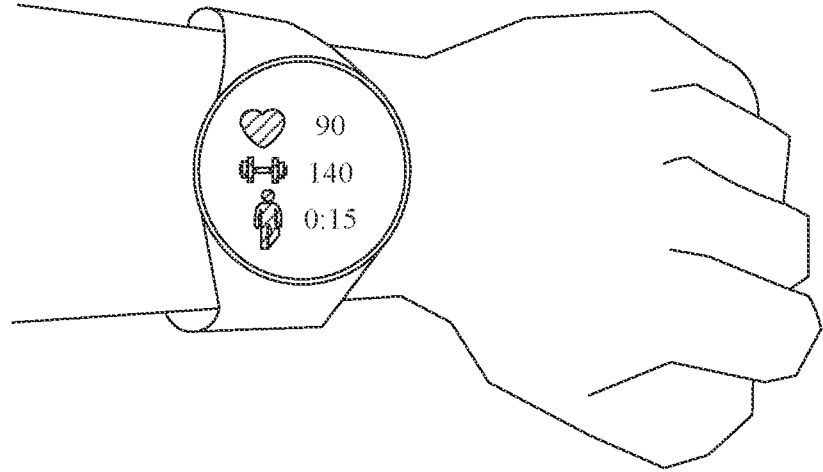
FIG. 34 is a schematic diagram of a display interface of a watch face of a watch according to an embodiment of this application.

Optionally, after the user stops using the VR software, the watch can further optionally display information such as an average heartbeat of the user in the VR mode, calories burned by the user in an entire process, use time of the user in the entire process in the VR mode, and standing time of the user in the entire process in the VR mode. For example, FIG. 34 is a schematic diagram of a display interface of a watch face of a watch according to an embodiment of this application. As shown in FIG. 34, for example, after the user stops using the VR software, the watch displays a case in which the average heartbeat of the user in the VR mode is 90 beats per minute, the calories burned by the user in the entire process is 120 calories, and the use time of the user in the entire process in the VR mode is 15 minutes.

Optionally, the user may further tap icons of various data displayed on the watch face of the watch to view details of each parameter. For example, in response to a tap operation by the user on the average heartbeat icon, the watch may present heartbeat change information of the user in the entire VR mode to the user, for example, present the heartbeat change information in a form of a chart.

Optionally, the watch may further send the collected health data, fitness data, and the like of the user to the mobile phone, and the mobile phone may store the information for reference of the user.

It should be noted that, in the foregoing embodiments of this application, an example in which the wearable device is a watch is used to describe, based on the structure of the VR system shown in FIG. 1, specific implementation of reusing the wearable device as a VR peripheral for interaction between the user and the VR glasses. It should be understood that this embodiment of this application is also applicable to a scenario in which the wearable device is a band or another wearable device.

In addition, when embodiments of this application are applied to the VR system shown in FIG. 2, specific implementation of embodiments of this application is similar to that of the VR system shown in FIG. 1. A difference lies in that, in the foregoing example embodiments, some steps performed by the mobile phone in the VR system shown in FIG. 1 need to be jointly completed by the host and the mobile phone in the VR system shown in FIG. 2. For example, a process of starting the VR mode of the watch may be as follows: After the first VR application in the host starts, the host sends a start instruction to the mobile phone, the mobile phone may forward the start instruction to the watch, and the watch may switch from the normal running mode to the VR mode based on the start instruction. For another example, a specific implementation of displaying the synthesized image of the interface of game 1 and the first VR operation interface in the VR glasses may be: The mobile phone first obtains the interface of game 1 from the host, and obtains the first VR operation interface from the watch. Then, the mobile phone renders and synthesizes the interface of game 1 and the first VR operation interface, and sends a rendered and synthesized image to the host. The host may send the rendered and synthesized image to the VR glasses for display in the VR field of view. In other words, in the VR system shown in FIG. 2, for specific implementation of reusing the wearable device as a VR peripheral for interaction between the user and the VR glasses, refer to the VR system shown in FIG. 1. Details are not described in this embodiment of this application again.

Optionally, for the VR system shown in FIG. 1 and/or FIG. 2, in some embodiments, the mobile phone may also be replaced with another electronic device having a similar function, for example, a tablet computer. This is not limited in this application.

Figure 35:
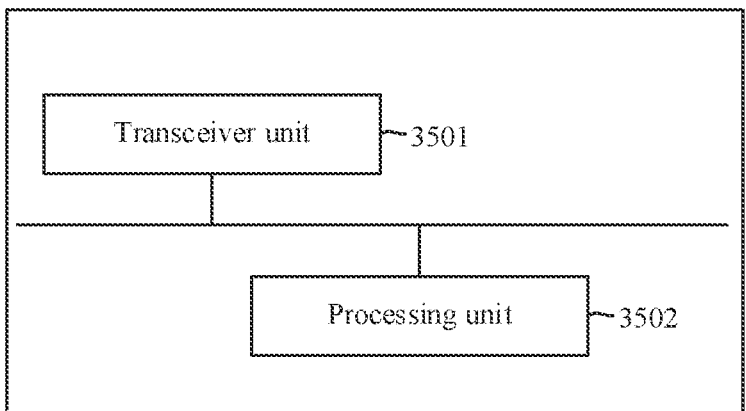
FIG. 35 is a schematic diagram of a structure of a VR interaction apparatus according to an embodiment of this application.

Corresponding to the functions of the first terminal in the VR interaction method in the foregoing embodiments, an embodiment of this application further provides an apparatus that can be used in the first terminal. For example, FIG. 35 is a schematic structural diagram of a VR interaction apparatus. As shown in FIG. 35, the apparatus includes a transceiver unit 3501 and a processing unit 3502.

When the first terminal starts running a first VR application, the transceiver unit 3501 is configured to send a VR start instruction to a wearable device, where the VR start instruction instructs the wearable device to switch from a normal running mode to a VR mode, so that the wearable device displays a VR basic operation interface. The transceiver unit 3501 is further configured to receive a first instruction from the wearable device, and the processing unit 3502 is configured to start running a first VR sub-application based on the first instruction. The first instruction is sent by the wearable device to the first terminal in response to a first operation by a user on the VR basic operation interface. The first VR sub-application is one of VR sub-applications included in the first VR application. When the first terminal runs the first VR sub-application, the processing unit 3502 is further configured to select, from a plurality of preset VR operation interfaces, a first VR operation interface that matches configuration information of the first VR sub-application. The transceiver unit 3501 is further configured to configure the first VR operation interface for the wearable device for display. The transceiver unit 3501 is further configured to: receive a second instruction from the wearable device, and control, based on the second instruction, the first VR sub-application to execute a first control function, where the second instruction is sent by the wearable device to the first terminal in response to a second operation by the user on the first VR operation interface.

Optionally, the transceiver unit 3501 and the processing unit 3502 may be further configured to implement other functions of the first terminal in the foregoing method embodiments, and details are not listed one by one herein.

Similarly, corresponding to the steps performed by the wearable device in the method in the foregoing embodiments, an embodiment of this application further provides a VR interaction apparatus that can be used in the wearable device. For example, the apparatus may also include a transceiver unit, a processing unit, and the like. For details, refer to the apparatus that is used in the first terminal and that is shown in FIG. 35.

The transceiver unit is configured to: receive a VR start instruction sent by a first terminal when the first terminal starts running a first VR application. The processing unit is configured to: switch from a normal running mode to a VR mode based on the VR start instruction, and display a VR basic operation interface. The processing unit is further configured to send a first instruction to the first terminal via the transceiver unit in response to a first operation by a user on the VR basic operation interface, where the first instruction instructs the first terminal to start running a first VR sub-application, and the first VR sub-application is one of VR sub-applications included in the first VR application. The transceiver unit is further configured to receive a first VR operation interface configured by the first terminal for display, where the first VR operation interface is a VR operation interface that is selected by the first terminal from a plurality of preset VR operation interfaces and that matches configuration information of the first VR sub-application. The processing unit is further configured to send a second instruction to the first terminal via the transceiver unit in response to a second operation by the user on the first VR operation interface, where the second instruction instructs the first terminal to control the first VR sub-application to perform a first control function.

Optionally, the transceiver unit and the processing unit may be further configured to implement other functions of the wearable device in the foregoing method embodiments, and details are not listed one by one herein.

It should be understood that division of units or modules (referred to as units below) in the foregoing apparatuses is merely logical function division. In actual implementation, all or some of the units or modules may be integrated into one physical entity, or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware.

For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, the unit in the foregoing apparatus may be one or more integrated circuits configured to implement the foregoing method, for example, one or more ASICs, one or more DSPs, one or more FPGAs, or a combination of at least two of the integrated circuit forms.

For another example, when the unit in the apparatus may be implemented in a form of a program invoked by a processing element, the processing element may be a general-purpose processor, for example, a CPU or another processor that can invoke the program. For still another example, the units may be integrated and implemented in a form of a system-on-a-chip (system-on-a-chip, SoC).

In an implementation, the units that implement the corresponding steps in the foregoing method in the foregoing apparatuses may be implemented in a form of scheduling a program by using a processing element. For example, the apparatus may include a processing element and a storage element. The processing element invokes a program stored in the storage element, to perform the method in the foregoing method embodiments. The storage element may be a storage element whose processing element is located on a same chip, that is, an on-chip storage element.

In another implementation, the program for performing the foregoing method may be in a storage element located on a different chip from the processing element, that is, an off-chip storage element. In this case, the processing element invokes or loads the program from the off-chip storage element to an on-chip storage element, to invoke and perform the method according to the foregoing method embodiments.

For example, an embodiment of this application may further provide an apparatus, for example, an electronic device. The apparatus may include a processor and a memory configured to store executable instructions of the processor. When the processor is configured to execute the foregoing instructions, the electronic device is enabled to implement the method performed by the first terminal or the wearable device in the foregoing embodiments. For example, the electronic device may be the first terminal or the wearable device in the foregoing embodiments. The memory may be located inside the electronic device, or may be located outside the electronic device. There are one or more processors.

In still another implementation, units of the apparatus that implement the steps in the foregoing method may be configured as one or more processing elements. These processing elements may be disposed on the corresponding electronic device. The processing element herein may be an integrated circuit, for example, one or more ASICs, one or more DSPs, one or more FPGAs, or a combination of these types of integrated circuits. These integrated circuits may be integrated together to form a chip.

For example, an embodiment of this application further provides a chip. The chip may be used in the foregoing first terminal or wearable device. The chip includes one or more interface circuits and one or more processors. The interface circuit and the processor are interconnected through a line. The processor receives and executes computer instructions from a memory of the electronic device via the interface circuit, to implement the method performed by the first terminal or the wearable device in the foregoing method embodiments.

An embodiment of this application further provides a computer program product, including computer instructions run by an electronic device, such as the foregoing first terminal (for example, a mobile phone) or the foregoing wearable device (for example, a watch).

The foregoing descriptions about implementations allow a person skilled in the art to understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatuses and method may be implemented in other manners. For example, the described apparatus embodiments are merely examples. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product, for example, a program. The software product is stored in a program product, for example, a computer-readable storage medium, and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

For example, an embodiment of this application may further provide a computer-readable storage medium. The computer-readable storage medium stores computer program instructions. When the computer program instructions are executed by an electronic device, the electronic device is enabled to implement the method performed by the first terminal or the wearable device in the foregoing method embodiments.

Optionally, an embodiment of this application further provides a VR system. For example, a system architecture of the VR system may be shown in FIG. 1 or FIG. 2, and includes at least a first terminal and a wearable device. The first terminal is connected to the wearable device. When the first terminal starts running a first VR application, the first terminal sends a VR start instruction to the wearable device. The wearable device switches from a normal running mode to a VR mode based on the VR start instruction, and displays a VR basic operation interface. The wearable device sends a first instruction to the first terminal in response to a first operation by a user on the VR basic operation interface. The first terminal starts running a first VR sub-application based on the first instruction, where the first VR sub-application is one of VR sub-applications included in the first VR application. When the first terminal runs the first VR sub-application, the first terminal selects, from a plurality of preset VR operation interfaces, a first VR operation interface that matches configuration information of the first VR sub-application, and configures the first VR operation interface for the wearable device for display. The wearable device sends a second instruction to the first terminal in response to a second operation by the user on the first VR operation interface, and the first terminal controls, based on the second instruction, the first VR sub-application to perform a first control function.

Similarly, the first terminal and the wearable device may further cooperate to implement other functions in the method in the foregoing embodiments, and are not listed one by one herein.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A virtual reality (VR) interaction method comprising:

sending, to a wearable device, a VR start instruction when a terminal starts running a first VR application, wherein the VR start instruction instructs the wearable device to switch from a normal running mode to a VR mode such that the wearable device displays a VR basic operation interface;

receiving, from the wearable device, a first instruction associated with a first operation by a user on the VR basic operation interface;

starting running, based on the first instruction, a first VR sub-application of VR sub-applications comprised in the first VR application;

selecting, from a plurality of preset VR operation interfaces, a first VR operation interface that matches configuration information of the first VR sub-application when the terminal runs the first VR sub-application;

configuring the first VR operation interface for the wearable device to display;

coupling the terminal with VR glasses;

performing synthesis and rendering on a first interface of the first VR application and the VR basic operation interface and sending a first synthesized image of the first interface and the VR basic operation interface to the VR glasses when the terminal runs the first VR application;

receiving, from the wearable device, a second instruction associated with a second operation by the user on the first VR operation interface;

controlling, based on the second instruction, the first VR sub-application to execute a first control function; and performing synthesis and rendering on a second interface of the first VR sub-application and the first VR operation interface and sending a second synthesized image of the second interface and the first VR operation interface to the VR glasses when the terminal runs the first VR sub-application, wherein a change by the user of an operated function control on the first VR operation interface is displayed in a VR field of view.

2. The VR interaction method of claim 1, wherein the first VR operation interface comprises a function control, wherein the configuration information comprises the first control function of the first VR sub-application, and wherein selecting the first VR operation interface comprises selecting the first VR operation interface that comprises a mapping relationship between the function control and the first control function.

3. The VR interaction method of claim 2, further comprising:

receiving, from the wearable device, a first update instruction; and updating, based on the first update instruction, the mapping relationship.

4. The VR interaction method of claim 3, further comprising:

performing synthesis and rendering on a first interface of the first VR sub-application and the first VR operation interface; and zooming in the first VR operation interface relative to the first interface when the first VR operation interface is in a configurable state.

5. The VR interaction method of claim 4, further comprising weakening the first interface when the first VR operation interface is in the configurable state.

6. The VR interaction method of claim 2, further comprising:

receiving, from the wearable device, a second update instruction; and updating, based on the second update instruction, a layout of an area in which the function control is located.

7. The VR interaction method of claim 2, further comprising:

displaying a first interface of the first VR sub-application and the first VR operation interface through screen splitting;

switching, in response to a configuration trigger operation on the first VR operation interface, the first VR operation interface to a configurable state; and updating, in response to a first update operation by the user on the first VR operation interface in the configurable state, the mapping relationship.

8. The VR interaction method of claim 7, further comprising updating, in response to a second update operation by the user on the first VR operation interface in the configurable state, a layout of an area in which the function control is located.

9. The VR interaction method of claim 1, further comprising:

receiving a first location relationship of a finger of the user relative to the VR basic operation interface; and generating a first virtual finger in the first synthesized image based on the first location relationship.

10. The VR interaction method of claim 1, further comprising:

receiving a second location relationship of a finger of the user relative to the first VR operation interface; and generating a second virtual finger in the second synthesized image based on the second location relationship.

11. The VR interaction method of claim 1, comprising:

receiving a video image in which the user holds the wearable device in hand and that is captured by a camera;

performing synthesis and rendering on a first interface of the first VR application and the video image and sending a first synthesized image of the first interface and the video image to the VR glasses when the terminal runs the first VR application; and performing synthesis and rendering on a second interface of the first VR sub-application and the video image and sending a second synthesized image of the second interface and the video image to the VR glasses when the terminal runs the first VR sub-application.

12. The VR interaction method of claim 1, wherein the terminal comprises a configuration interface for configuring a preset VR operation interface, and wherein the VR interaction method further comprises:

displaying, in response to a selection operation by the user on the configuration interface, the preset VR operation interface; and updating, in response to a first update operation by the user on the preset VR operation interface, a mapping relationship between the first control function of the first VR sub-application and a function control comprised in the preset VR operation interface.

13. The VR interaction method of claim 12, further comprising updating, in response to a second update operation by the user on the preset VR operation interface, a layout of an area in which the function control is located.

14. The VR interaction method of claim 1, further comprising:

receiving, from the wearable device, a switching instruction; and switching the first VR operation interface that matches the configuration information to a second VR operation interface based on the switching instruction.

15. The VR interaction method of claim 1, wherein configuring the first VR operation interface comprises sending, to the wearable device, interface configuration information of the first VR operation interface, or sending, to the wearable device, a picture corresponding to the first VR operation interface to the wearable device, and wherein the picture comprises identification information of a function control comprised in the first VR operation interface.

16. The VR interaction method of claim 15, wherein the wearable device comprises a watch or a band, and wherein the VR interaction method further comprises:

sending, to the wearable device, the interface configuration information when the wearable device is the watch; and sending, to the wearable device, the picture when the wearable device is the band.

17. The VR interaction method of claim 15, further comprising sending, to the wearable device, a mapping relationship between the function control and the first control function of the first VR sub-application.

18. The VR interaction method of claim 1, wherein the wearable device comprises a first wearable device and a second wearable device, and wherein configuring the first VR operation interface comprises:

splitting the first VR operation interface into a first sub-interface and a second sub-interface;

configuring the first sub-interface for the first wearable device for display; and configuring the second sub-interface for the second wearable device for display.

19. A terminal comprising:

a memory configured to store instructions; and one or more processors coupled to the memory and configured to:

send, to a wearable device, a virtual reality (VR) start instruction when the terminal starts running a first VR application, wherein the VR start instruction instructs the wearable device to switch from a normal running mode to a VR mode such that the wearable device displays a VR basic operation interface;

receive, from the wearable device, a first instruction associated with a first operation by a user on the VR basic operation interface;

start running, based on the first instruction, a first VR sub-application of VR sub-applications comprised in the first VR application;

select, from a plurality of preset VR operation interfaces, a first VR operation interface that matches configuration information of the first VR sub-application when the terminal runs the first VR sub-application;

couple the terminal with VR glasses;

perform synthesis and rendering on a first interface of the first VR application and the VR basic operation interface and sending a first synthesized image of the first interface and the VR basic operation interface to the VR glasses when the terminal runs the first VR application;

configure the first VR operation interface for the wearable device to display;

receive, from the wearable device, a second instruction associated with a second operation by the user on the first VR operation interface;

control, based on the second instruction, the first VR sub-application to execute a first control function; and perform synthesis and rendering on a second interface of the first VR sub-application and the first VR operation interface and sending a second synthesized image of the second interface and the first VR operation interface to the VR glasses when the terminal runs the first VR sub-application, wherein a change by the user of an operated function control on the first VR operation interface is displayed in a VR field of view.

20. A computer program product comprising instructions stored on a non-transitory computer-readable medium that, when executed by one or more processors, cause a terminal to:

send, to a wearable device, a virtual reality (VR) start instruction when the terminal starts running a first VR application, wherein the VR start instruction instructs the wearable device to switch from a normal running mode to a VR mode such that the wearable device displays a VR basic operation interface;

receive, from the wearable device, a first instruction associated with a first operation by a user on the VR basic operation interface;

start running, based on the first instruction, a first VR sub-application of VR sub-applications comprised in the first VR application;

select, from a plurality of preset VR operation interfaces, a first VR operation interface that matches configuration information of the first VR sub-application when the terminal runs the first VR sub-application;

couple the terminal with VR glasses;

perform synthesis and rendering on a first interface of the first VR application and the VR basic operation interface and sending a first synthesized image of the first interface and the VR basic operation interface to the VR glasses when the terminal runs the first VR application;

configure the first VR operation interface for the wearable device to display;

receive, from the wearable device, a second instruction associated with a second operation by the user on the first VR operation interface;

control, based on the second instruction, the first VR sub-application to execute a first control function; and perform synthesis and rendering on a second interface of the first VR sub-application and the first VR operation interface and sending a second synthesized image of the second interface and the first VR operation interface to the VR glasses when the terminal runs the first VR sub-application, wherein a change by the user of an operated function control on the first VR operation interface is displayed in a VR field of view.

* * * * *